United States Patent
Goldman et al.

[15] 3,697,956
[45] Oct. 10, 1972

[54] COMPUTER SYSTEM AND COLOR ADAPTER FOR IMAGING DETECTORS AND METHOD OF OPERATION

[72] Inventors: Samuel C. Goldman, Branford; Lance M. Albrecht, Wallingford, both of Conn.

[73] Assignee: Picker Corporation

[22] Filed: June 19, 1970

[21] Appl. No.: 49,999

[52] U.S. Cl............................340/172.5, 346/33 ME
[51] Int. Cl..............................G01d 9/42, G06f 3/14
[58] Field of Search................340/172.5; 346/33 ME

[56] References Cited

UNITED STATES PATENTS

| | | | |
|---|---|---|---|
| 3,308,438 | 3/1967 | Spergel et al............340/172.5 |
| 3,483,565 | 12/1969 | Jaffe et al. ............346/33 ME |
| 3,087,487 | 4/1963 | Clynes..............346/33 ME X |
| 3,274,557 | 9/1966 | Prager....................340/172.5 |
| 3,333,247 | 7/1967 | Hadley et al............340/172.5 |
| 3,345,613 | 10/1967 | Bucholtz et al.........340/172.5 |
| 3,345,616 | 10/1967 | Avril et al...............340/172.5 |

FOREIGN PATENTS OR APPLICATIONS 1,090,451   11/1967   Great Britain

*Primary Examiner*—Paul J. Henon
*Assistant Examiner*—Melvin B. Chapnick
*Attorney*—Watts, Hoffmann, Fisher & Heinke

[57] ABSTRACT

A computer and color adapter system for an imaging detector, such as a Gamma ray imaging camera, for providing a visual presentation of the detected image. The signals developed by the imaging detector, in response to radiation stimuli, are applied to a digital computer when the signals are stored, and modified if desired. The stored signals may then be translated into visual form by applying them to an oscilloscope, or other similar read-out device. A color camera system, including a color filter disc, may by utilized in conjunction with the oscilloscope and the computer in order to provide a multi-colored photograph representative of the detected image.

31 Claims, 39 Drawing Figures

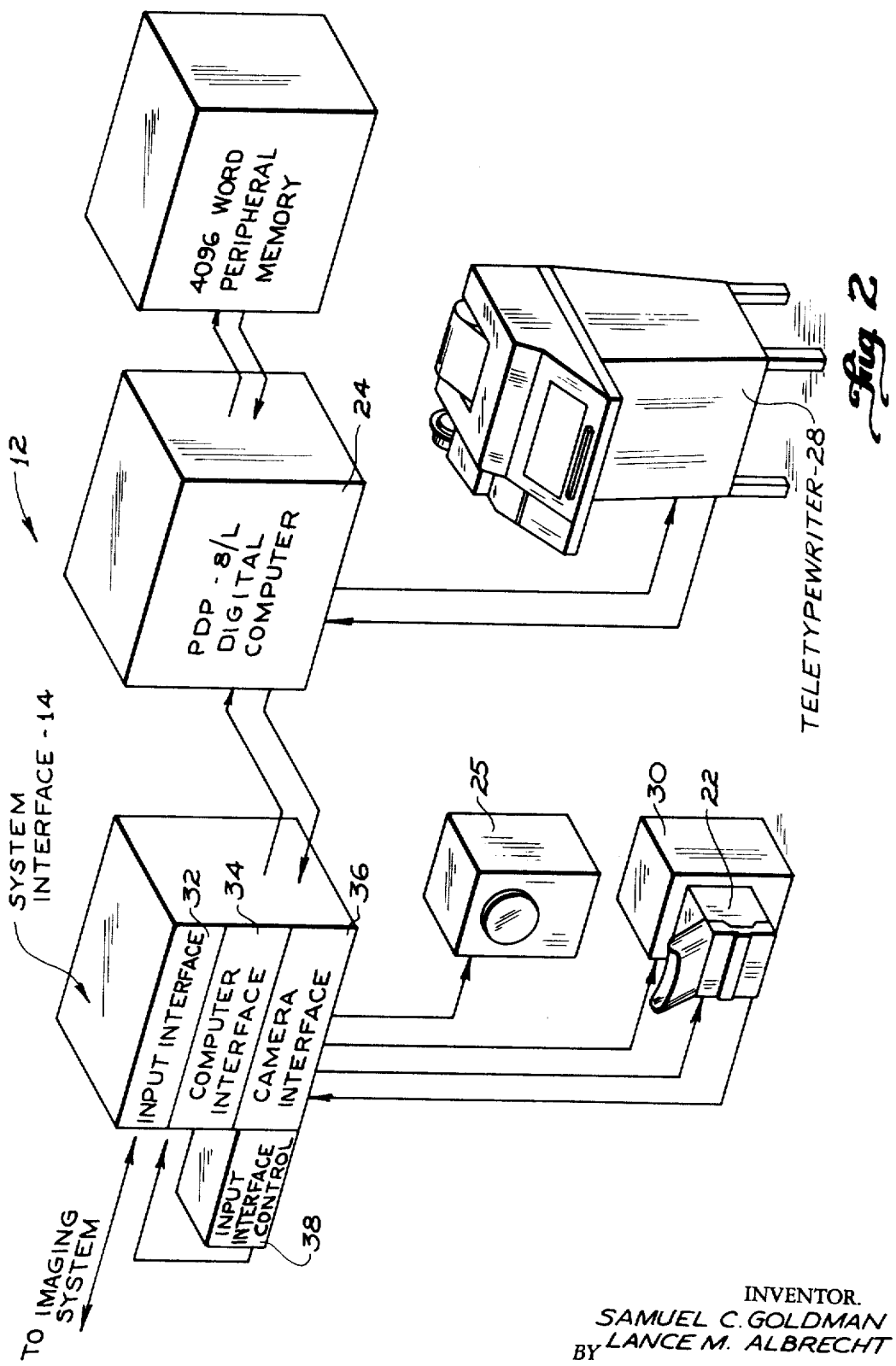

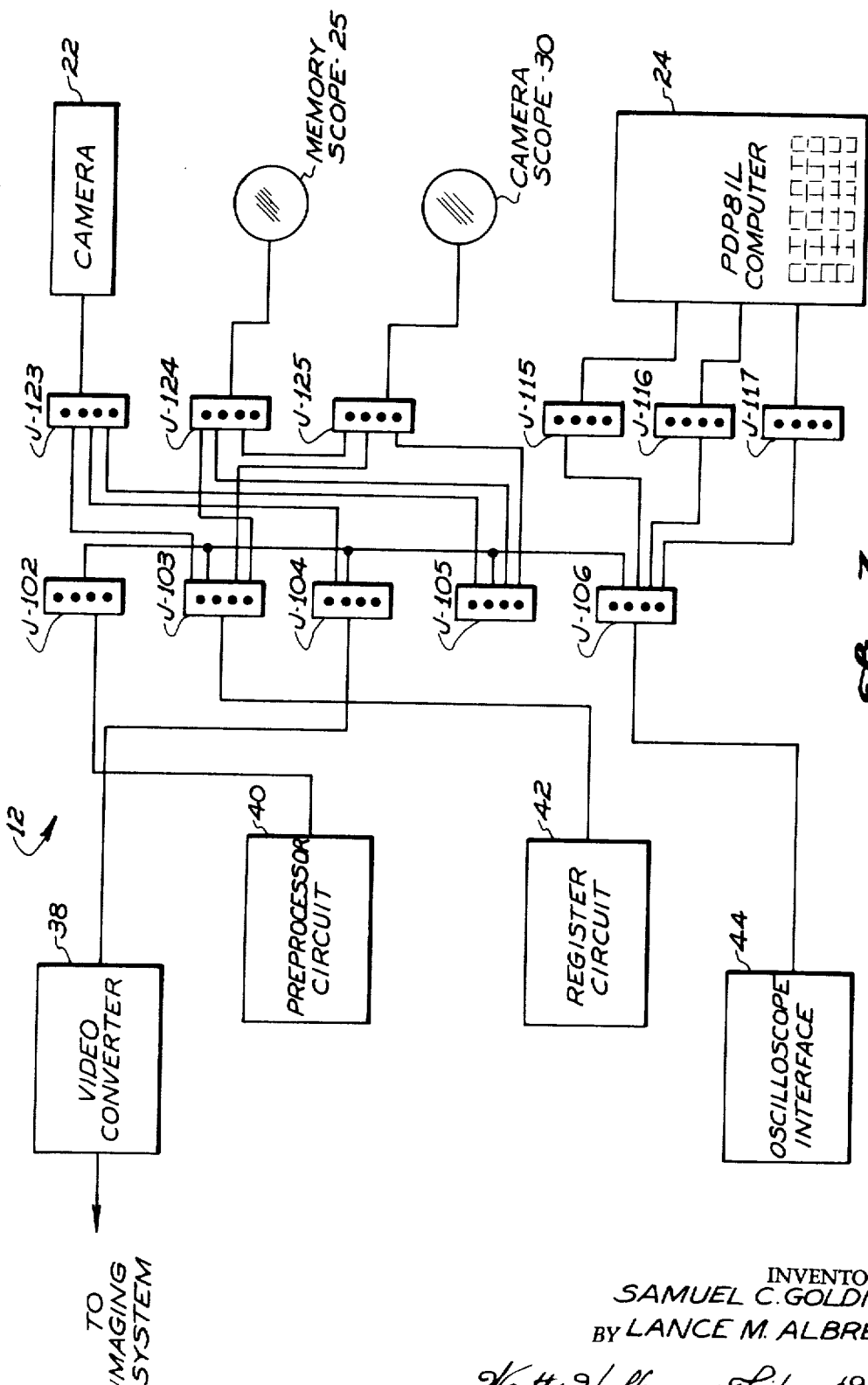

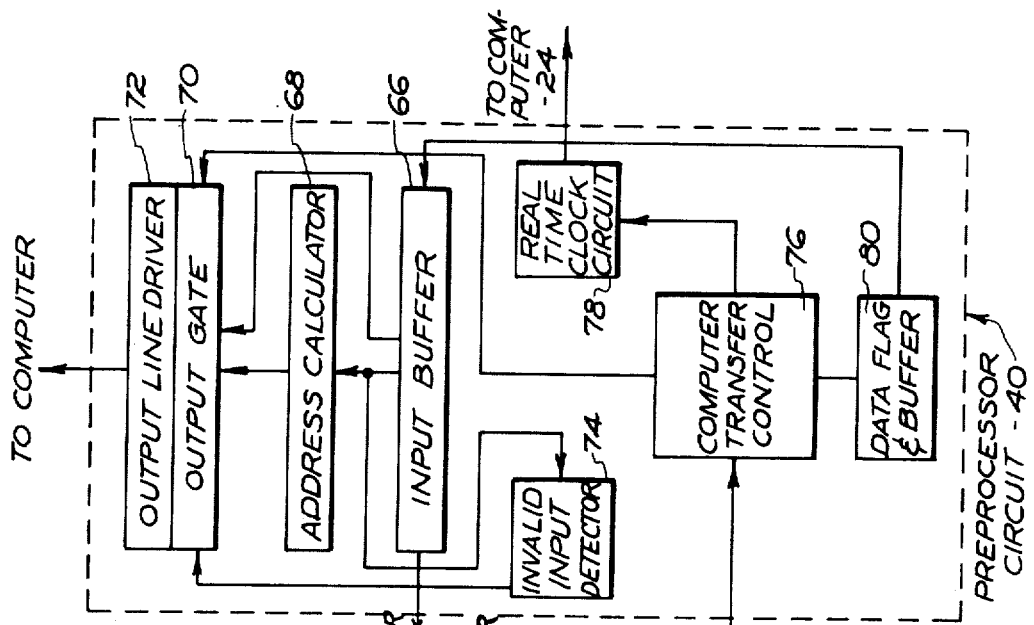
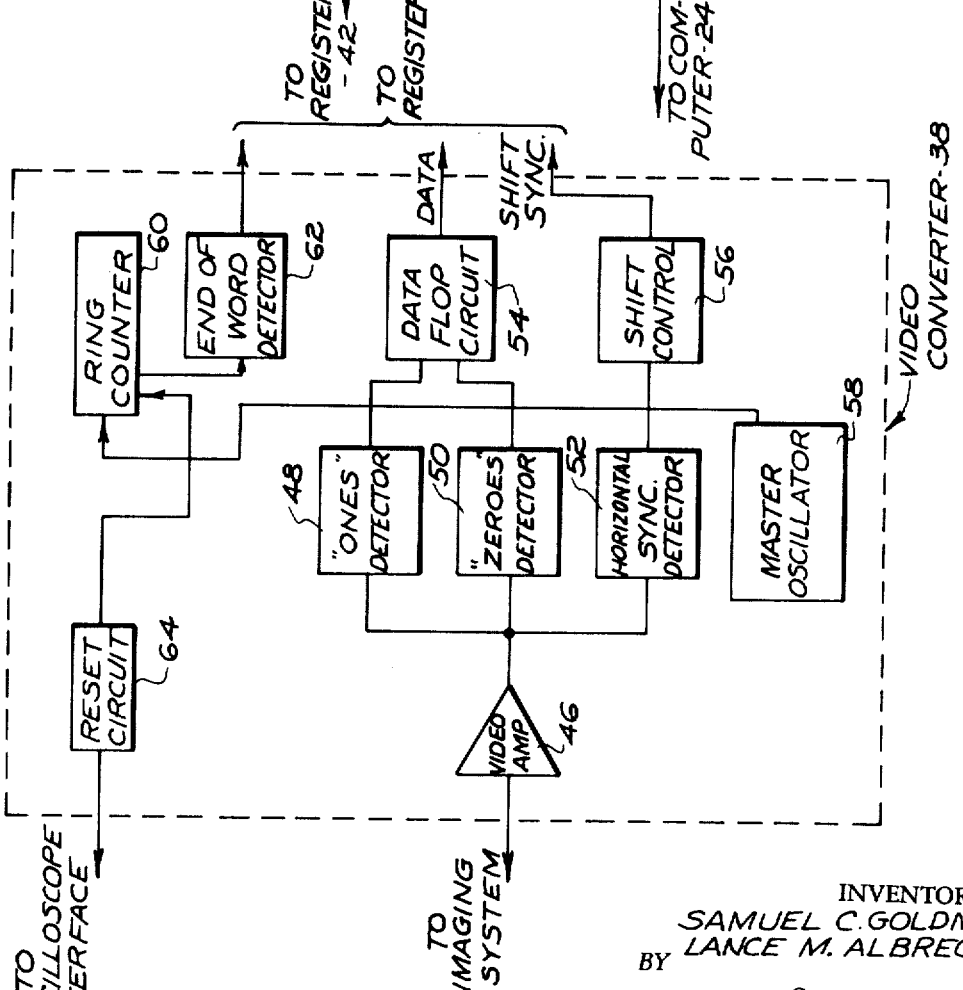

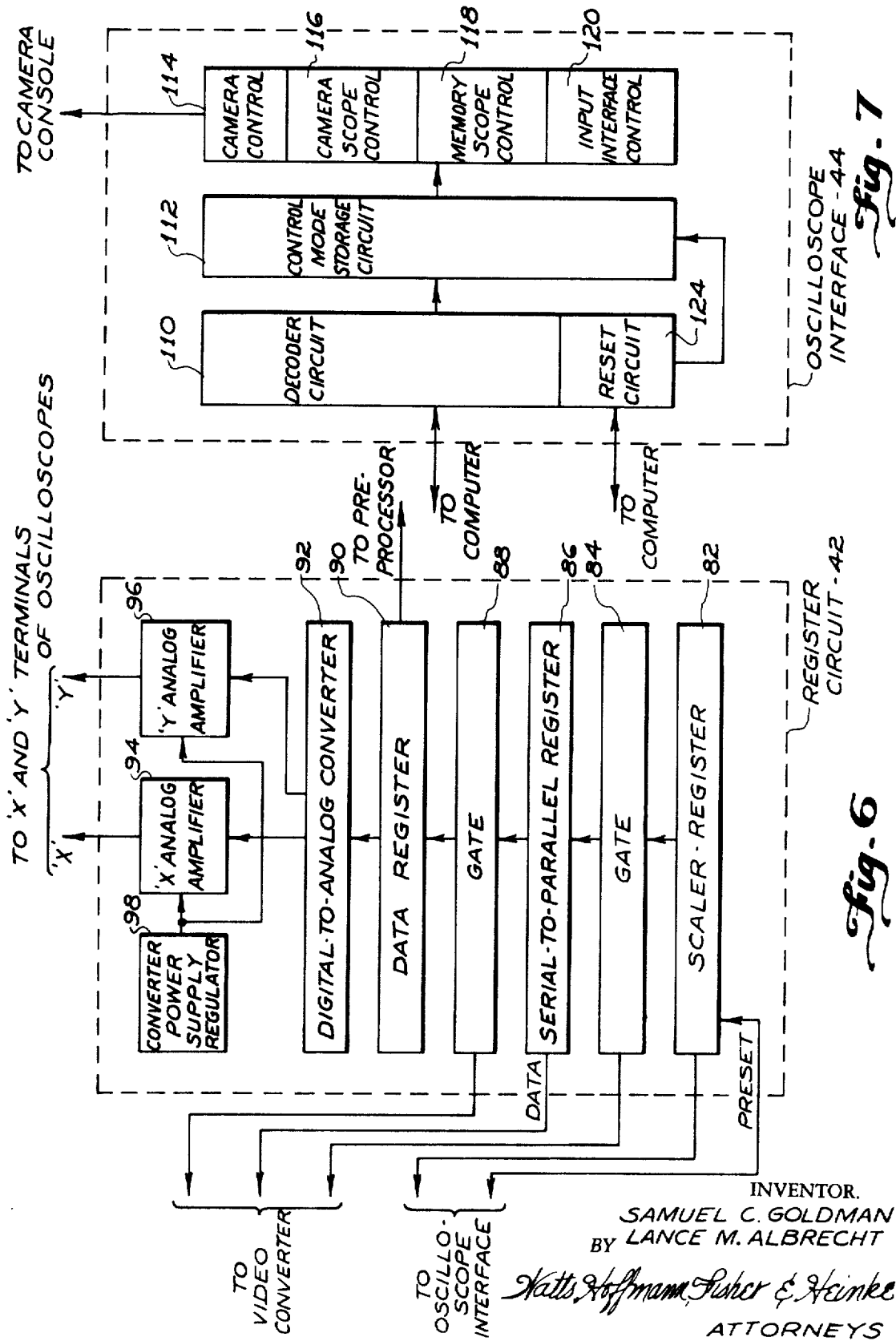

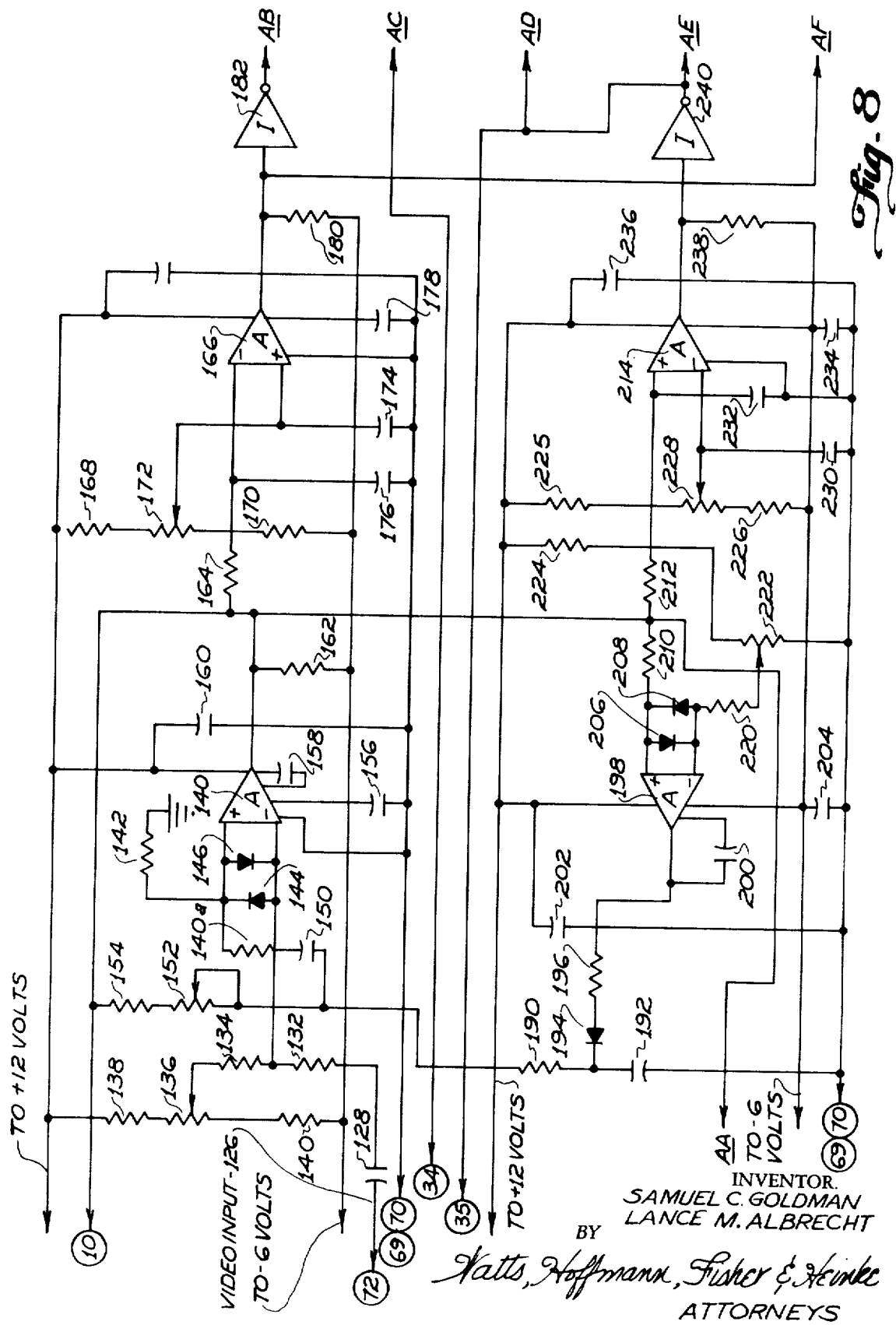

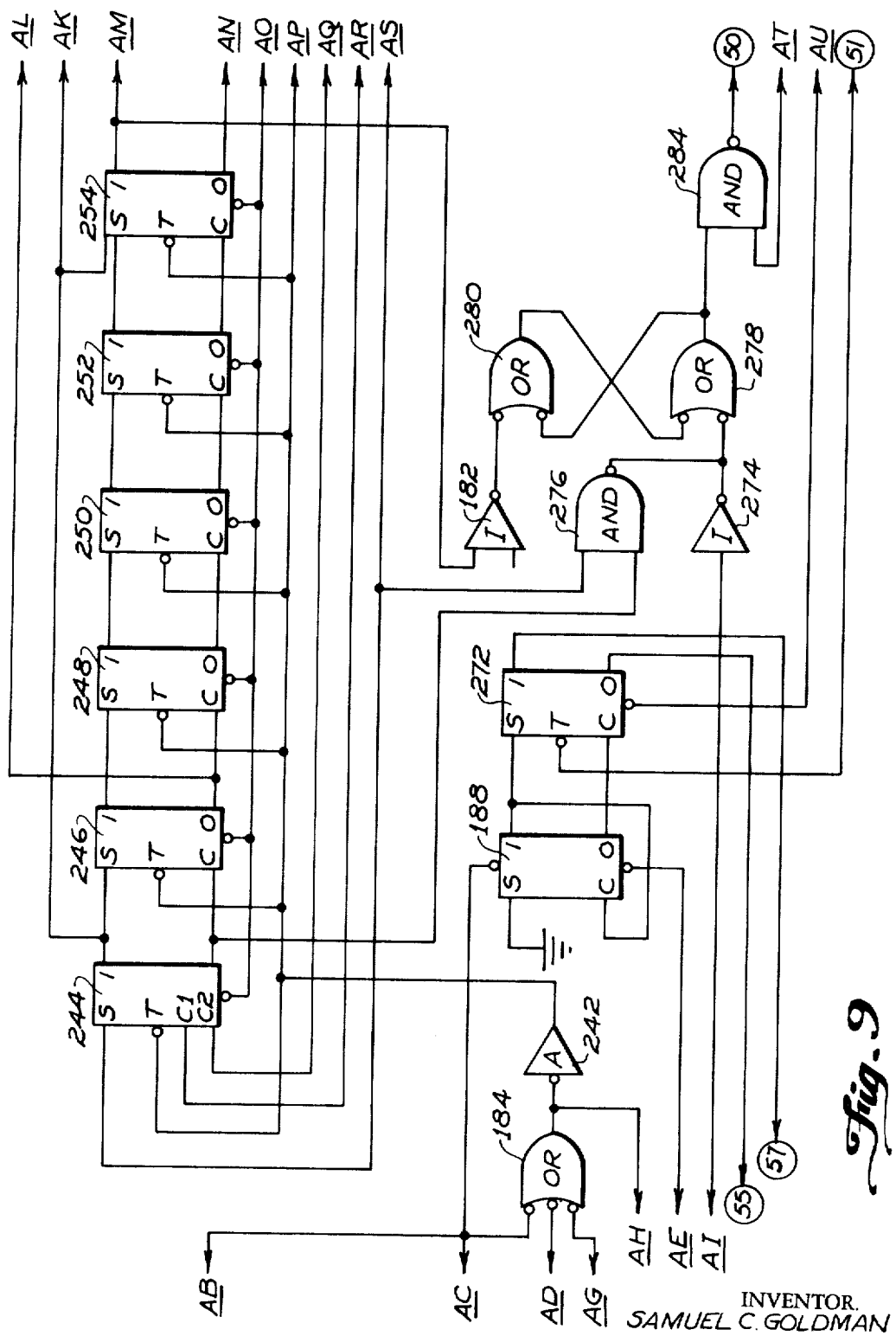

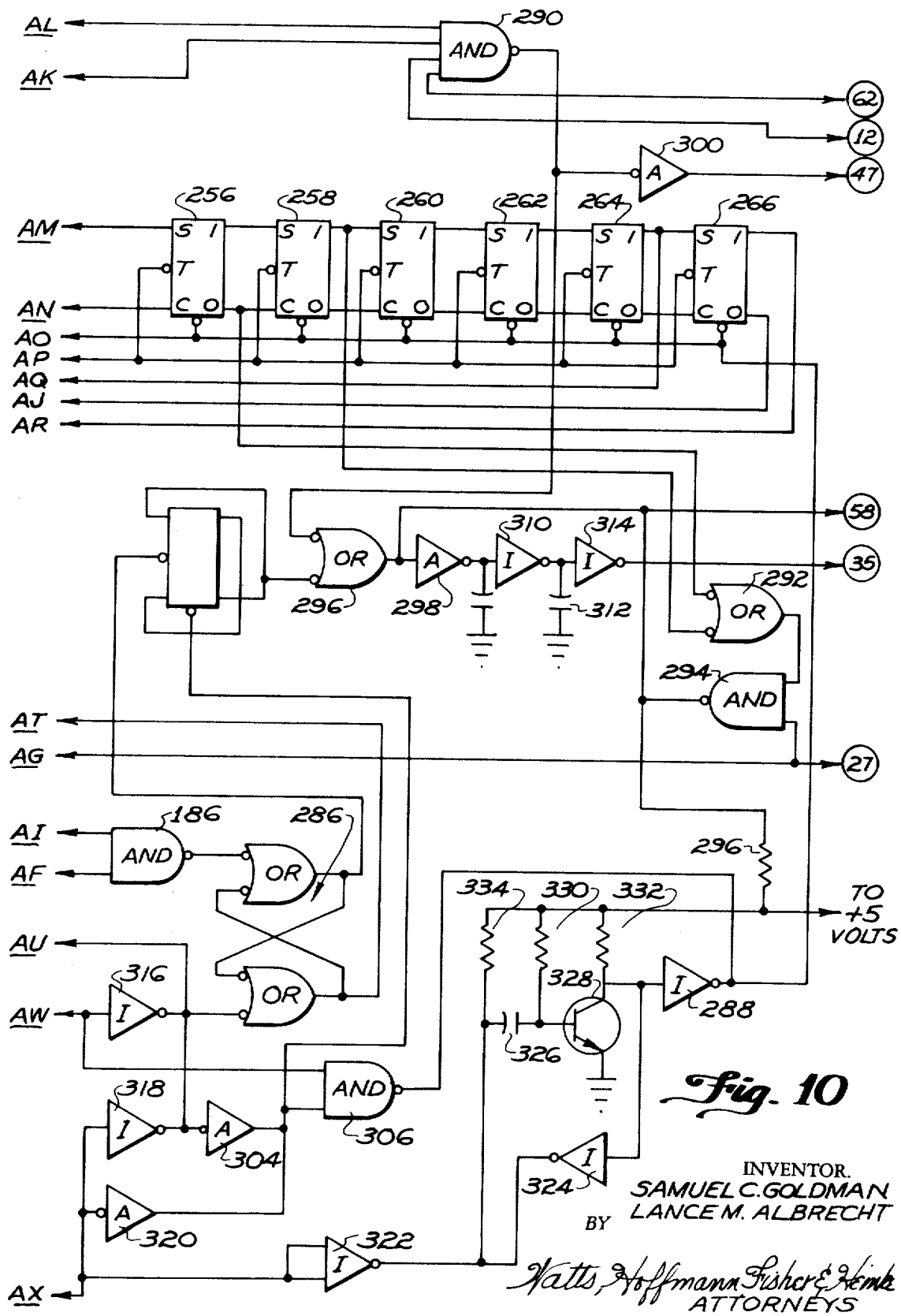

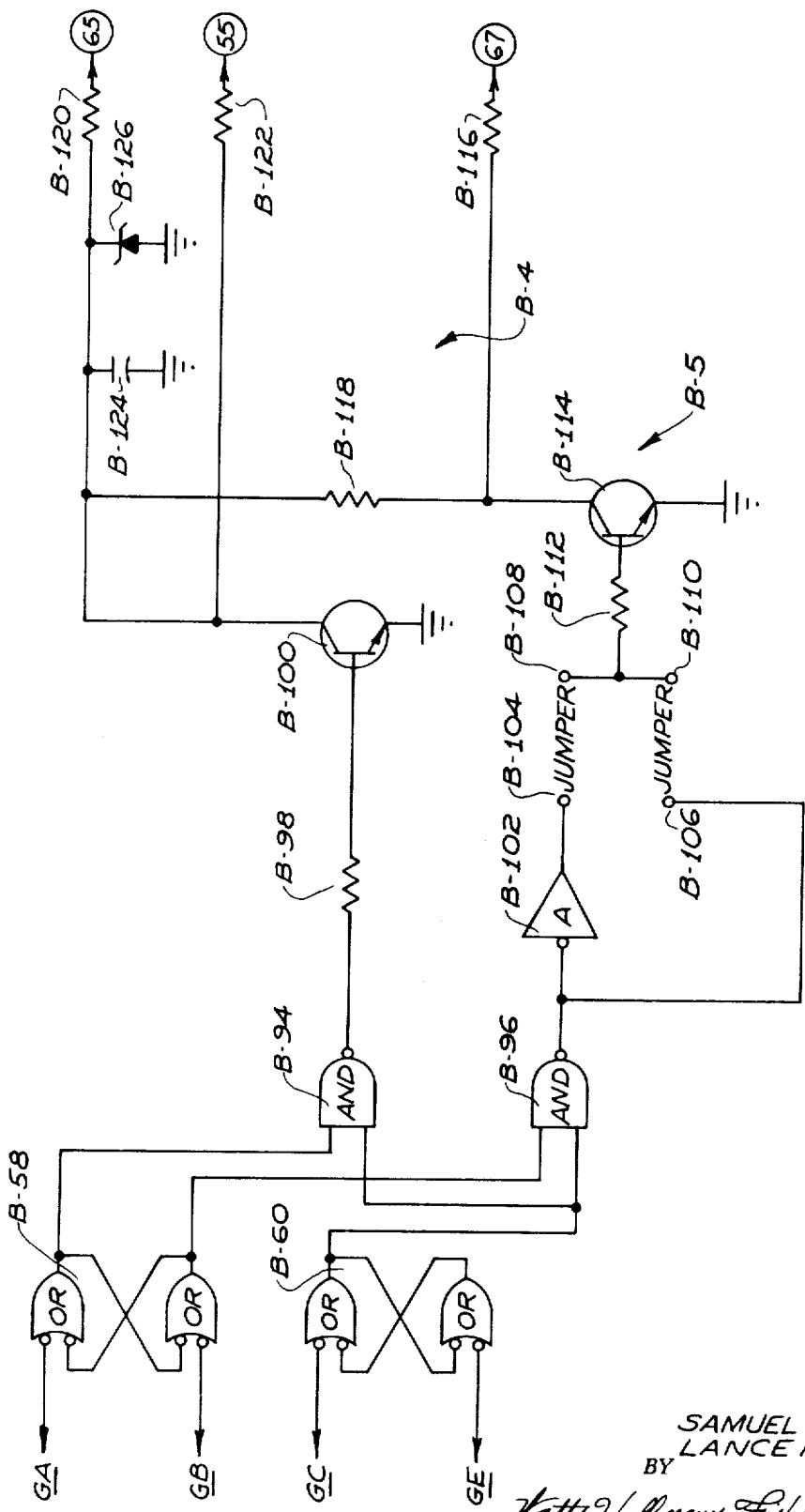

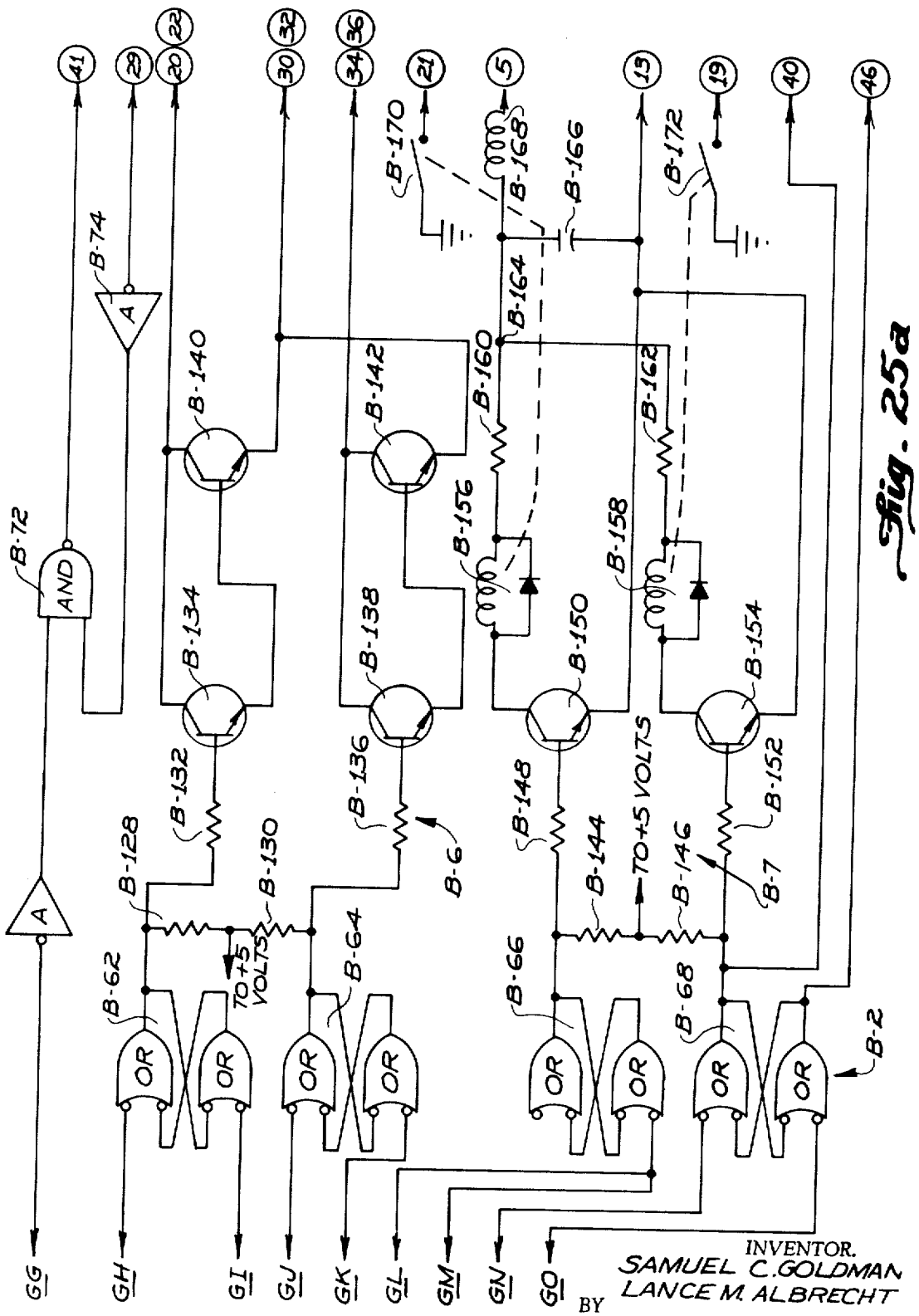

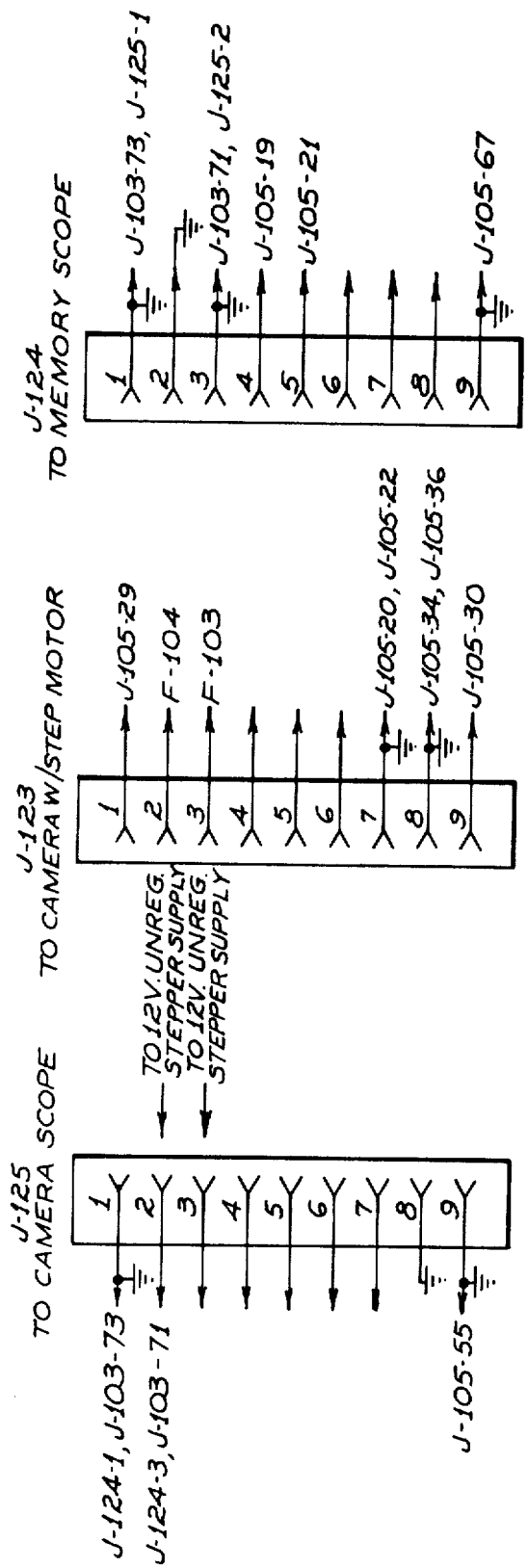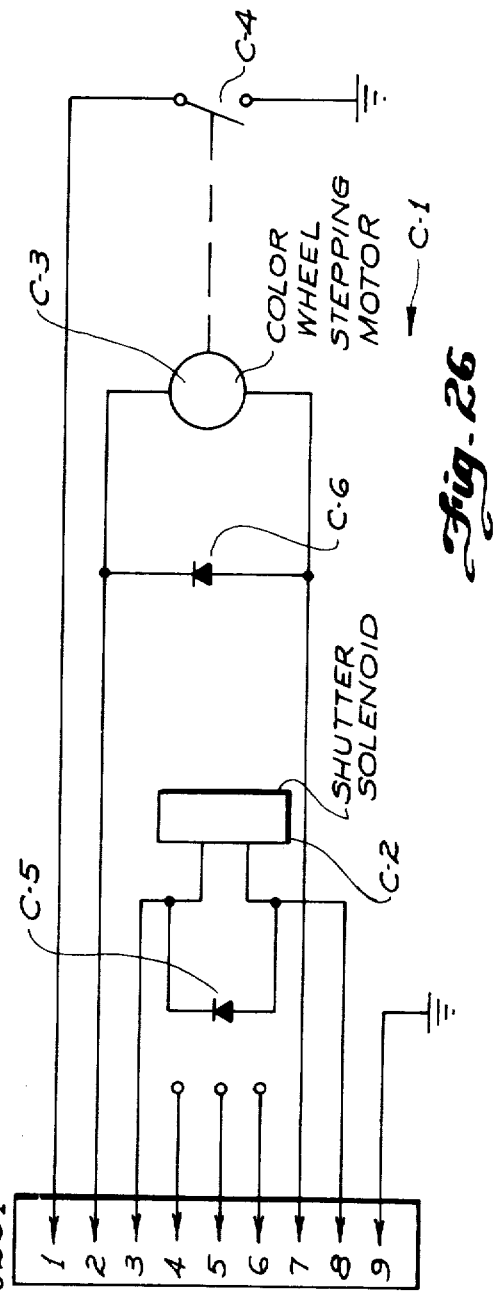

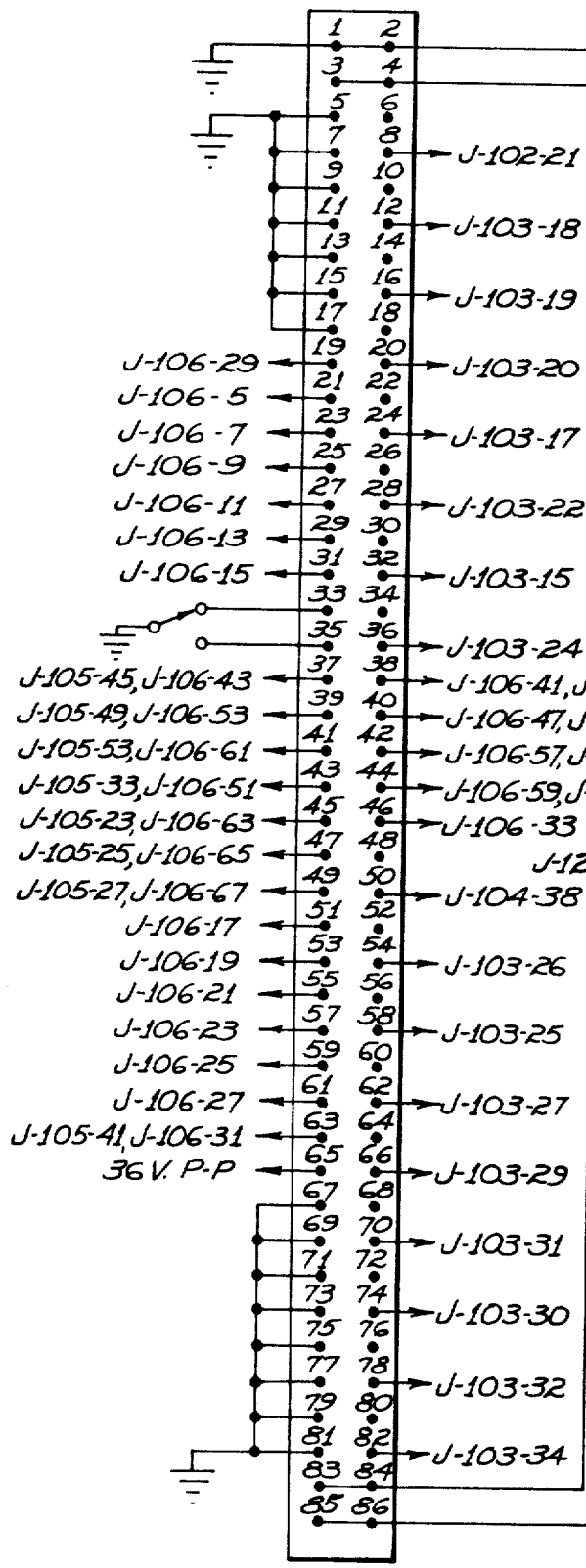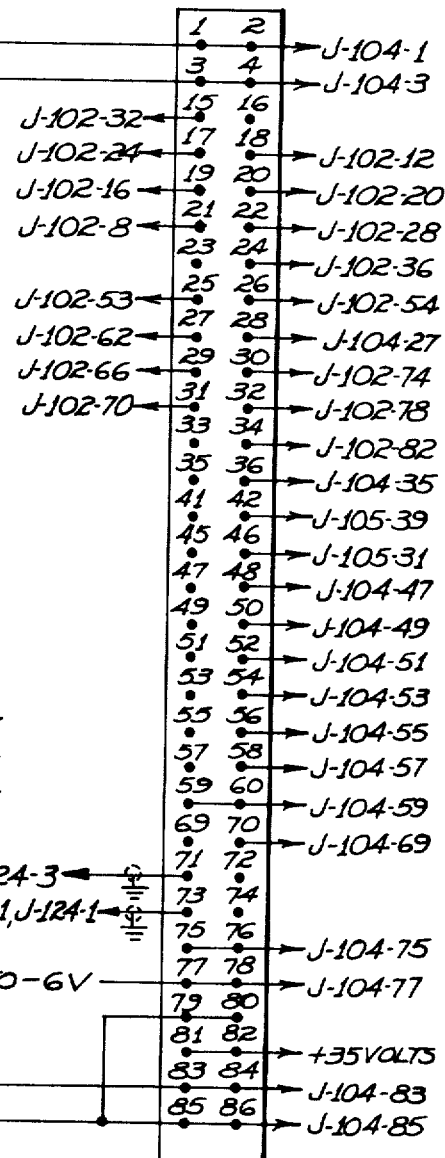
Fig. 28
INVENTOR.
SAMUEL C. GOLDMAN
LANCE M. ALBRECHT
BY
ATTORNEYS

INVENTOR.
SAMUEL C. GOLDMAN
BY LANCE M. ALBRECHT

ATTORNEYS

INVENTOR.
SAMUEL C. GOLDMAN
BY LANCE M. ALBRECHT

COMPUTER SYSTEM AND COLOR ADAPTER FOR IMAGING DETECTORS AND METHOD OF OPERATION

CROSS REFERENCE TO RELATED PATENT APPLICATIONS AND PATENTS

U.S. Pat. Application, ser. No. 837,072 to R. Hindel et al., entitled, "Scintillation Camera," and filed on June 27, 1969.

U.S. Pat. No. 3,303,508 to H. L. Jaffe et al., entitled, "Photographic Color Scanning Apparatus," and issued on Feb. 7, 1967.

U.S. Pat. No. 3,483,565 to H. L. Jaffe et al., entitled, "Color Adapter for Multi-Detector Scanner," and issued on Dec. 9, 1969.

U.S. Pat. No. 3,601,799 to R. J. Martone et al., entitled, "Digital Recording Playback Technique," and issued Aug. 24, 1971.

BACKGROUND OF THE INVENTION

This invention pertains to the art of computer systems and color adapters for imaging systems, and more particularly, to a system which may be utilized with an imaging camera for providing an improved visual presentation of a detected image.

In the diagnosis of certain illnesses, radioactive isotopes are frequently administered to patients. These isotopes have the characteristic of concentrating in certain types of tissue, and the degree of concentration in the tissue is dependent upon the type of tissue. For example, Iodine 131 generally collects or concentrates in the thyroid glands. Upon detection of the radioisotope concentration and presentation of this detected information on a suitable read-out device, it is frequently possible to diagnose the condition of the tissue under examination.

Generally, the electrical signals developed by a scintillation camera system are translated into visual form by applying the signals to an oscilloscope, or other similar device. Photographic camera devices are then frequently disposed to view the face of a cathode ray tube of the oscilloscope to provide a photographic presentation of the visual image appearing on the oscilloscope.

Scanning apparatus which include a plurality of radiation detectors mounted on an arm which traverses or scans a subject to be examined have included color adapter systems for providing a photographic color presentation. In these scanning-type systems the traversing arm moves relatively slowly across the patient and the radiation detector units are only responsive to radiation emitting from a relatively small area. At these relatively slow speeds and with the relatively small radiation emitting area, enhancement of the output presentation requires simple electronic circuitry. Two different examples of color adapters for scanning-type radiation detection systems are disclosed in the above-referenced United States Patents to H. L. Jaffe et al.

While scanning devices continually traverse the subject to be examined, devices known as imaging cameras remain stationary with respect to the patient, and provide immediate and very rapid output information. A continuous graphic image of the spatial distribution of an isotope is presented on a read-out device, such as an oscilloscope. These imaging cameras generally incorporate a relatively large disc-shaped scintillation crystal which is positioned so that the crystal intercepts gamma radiations emitted by the patient. Generally, a collimator is interposed between the patient and the crystal.

The disc-shaped crystal scintillates upon absorbing gamma ray energy to thereby provide pulses of light energy. A thallium activated sodium iodide crystal is typically employed to produce scintillations of the gamma radiations. A plurality of phototubes are positioned to view the crystal so that when any one of the phototubes detects a scintillation, an electrical signal is developed. The electrical signal developed by the phototube is of an amplitude which is responsive both to the intensity of the light energy as well as the distance between the phototube and the pulse of light. The signals developed by the phototubes are then amplified and applied to appropriate electronic circuitry to thereby develop electrical signals representative of the position as well as the intensity of a pulse of light or scintillation. One such gamma ray imaging camera system is disclosed in the above-referenced Patent Application entitled, "Scintillation Camera", which is incorporated herein by reference.

It has been found to be highly desirable to slightly modify the output presentation of imaging devices, such as by enhancement of contrast, suppression of background interferences, and elimination of camera uniformity artifacts. In addition, it has also proven desirable to obtain a visual output presentation in colors corresponding to the intensity of the detected quantity.

It is therefore an object of the present invention to provide a computer system which may be utilized with imaging detectors for providing an improved and more useful output presentation.

Another object of the present invention is to provide a computer system which may be utilized to enhance an image.

Another object of the present invention is to provide a computer system which may be utilized with imaging cameras for modifying certain parameters of the detected quantity in order to present a more useful and meaningful output presentation.

A further object of the present invention is to provide an electronic system for enhancing the contrast of an imaging detector, such as a gamma ray imaging camera.

Another object of the present invention is to provide a color adapter which may be utilized with imaging detectors, such as a radiation imaging camera, for providing a multi-colored output presentation.

Another object of the present invention is to provide a color adapter for an imaging camera for providing a multi-colored output presentation wherein the different colors represent different levels of intensity.

A still further object of the present invention is to provide a computer system for an imaging camera in which dynamic function data may be analyzed.

Another object of the present invention is to provide a method of enhancing an image.

A still further object of the present invention is to provide a method of presenting a multi-colored output presentation wherein the colors are representative of image radiation count density.

SUMMARY OF THE INVENTION

The present invention is directed toward a computer system and a color adapter for imaging detectors, and method of operation thereof, thereby overcoming the noted disadvantages, and others, of such previous systems.

In accordance with one aspect of the present invention there is provided an imaging detection apparatus, such as a gamma ray imaging camera, for providing a plurality of signals representative of the spatial distribution of incident stimuli from a subject under investigation. The imaging detection apparatus includes a detector for developing electrical signals in response to the receipt of incident stimuli, and a detection circuit coupled to the detector for resolving the electrical signals into a plurality of signals having values representative of the positions of the incident stimuli. An image display system is adapted to be coupled to the detection circuit for receiving the position representative signals and translating these signals into an image display representative of the spatial distribution of the incident stimuli. The image display system includes a computer having a magnetic core storage with a plurality of storage channels each having an address corresponding to the location of that channel with respect to the other channels. An interfacing circuit is coupled between the detection circuit and the computer and includes a first circuit for developing address information for each of the plurality of position representative signals, and a second circuit for applying each of the plurality of position representative signals to a channel in the core storage having an address corresponding to the address information of that signal. The core storage is coupled through a converter circuit and an output circuit to an imaging device, such as a cathode ray tube, to thereby present a visual display representative of the stored image.

In accordance with another aspect of the present invention, there is provided a radiation imaging device comprising detection circuitry for developing a plurality of electrical signals which take the form of analog signals in response to the receipt of radiation. A converter is coupled to the detection circuitry for converting the plurality of analog electrical signals into electrical signals which take the form of digital signals. An interface circuit is coupled between the converter circuit and a digital computer. The interface circuit develops address information for each of the plurality of digital signals and applies each of these signals to a computer storage channel having an address corresponding to the address information developed for that signal. An output circuit is coupled to the storage means of the computer for developing a pattern of electrical signals representative of the signals stored in the storage channels.

In accordance with another aspect of the present invention, the output circuit includes a converter circuit for converting the pattern of digital signals into electrical signals which take the form of analog signals.

In accordance with another aspect of the present invention, the radiation imaging device includes an imaging read-out means, such as an oscilloscope, which is coupled to the output converter circuit for resolving the analog signals into a visual presentation representative of the computer stored signals.

In accordance with another aspect of the present invention, the radiation imaging device includes a holder for a photosensitive sheet disposed to support the sheet in a position for exposure by an illuminated spot generated by the imaging device and a color filter interposed between the illuminated spot and the photosensitive sheet. Also, circuitry is coupled between the computer storage for changing the color characteristics of the illuminated spot in accordance with the activity of the detector.

BRIEF DESCRIPTION OF THE DRAWINGS

FIG. 2 is a block diagram illustrating in basic form the image display system of FIG. 1;

FIG. 3 is a block diagram illustrating in more detail the image display system of FIG. 2;

FIGS. 4 through 7 are block diagrams illustrating in more detail the circuitry within certain of the block elements illustrated in FIG. 3;

FIGS. 8 through 11 are schematic diagrams illustrating in still more detail the circuitry within the video converter circuit as shown in FIG. 4;

FIGS. 24 through 25a are schematic diagrams illustrating in still more detail the circuitry within the oscilloscope interface as shown in FIG. 7;

FIG. 26 is a schematic diagram of the motor control circuitry for the camera mechanism as shown in FIG. 3;

FIGS. 27 through 31 illustrate connector blocks which set forth the circuit connections between the various components of the imaging display system; and, FIGS. 32 through 37 illustrate in more detail the camera mechanism as shown in FIG. 3.

DESCRIPTION OF A PREFERRED EMBODIMENT

Figure 1:
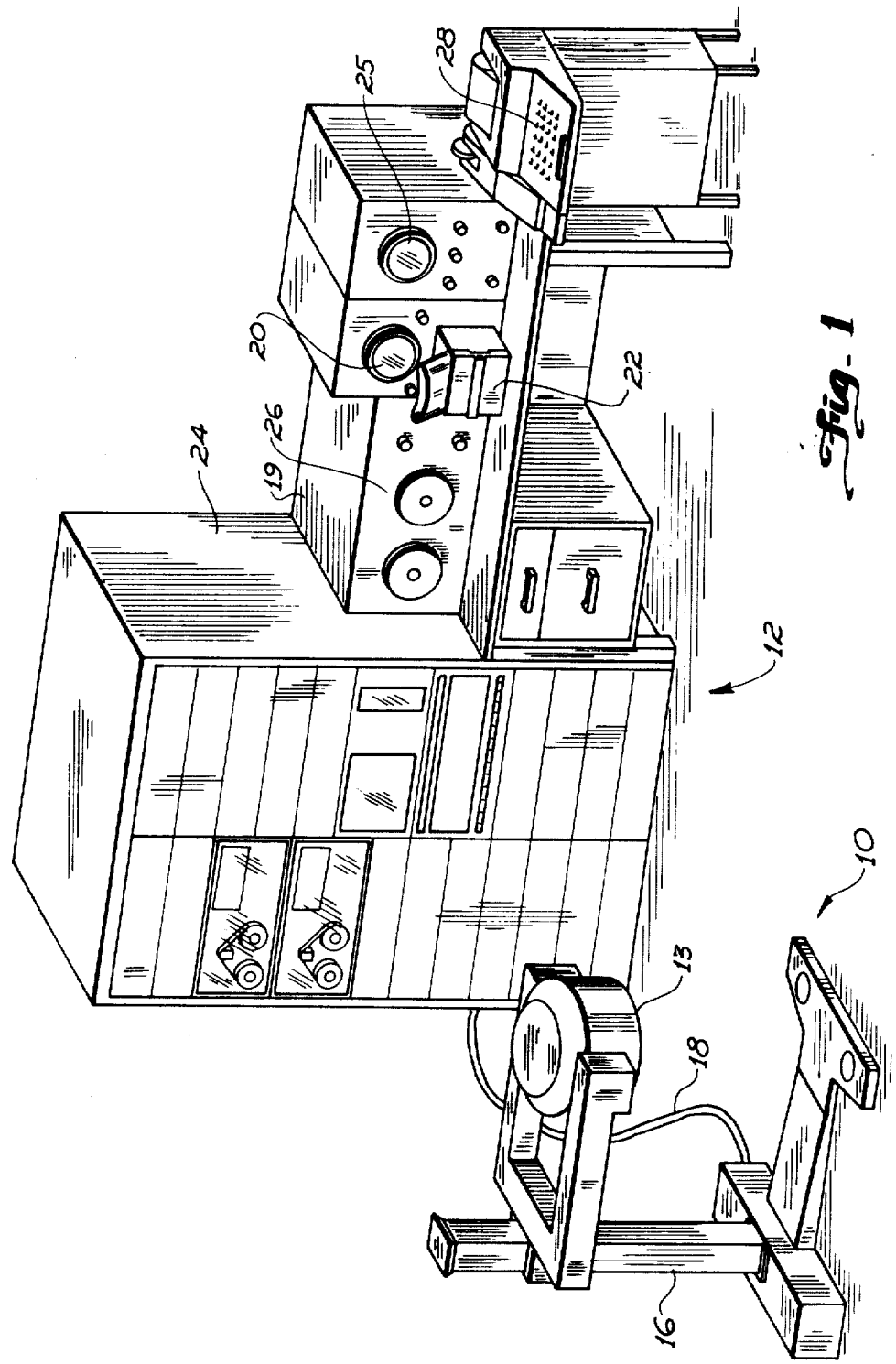
FIG. 1 is an oblique view of a gamma ray imaging camera and the associated image display system of the present invention.

FIG. 1 generally illustrates an imaging detector 10 coupled to image display system 12. The imaging detector 10 includes a detector head 13 mounted on a stand 16 for positioning the head 13 adjacent to a patient or other subject to be examined. Electrical signals from the imaging detector 10 are applied through an electrical cable 18 to the image display system 12. The image display system 12 generally comprises an electronics control console 19 coupled to the detector head 13, and a digital computer coupled to the electronics control console 19.

The signals developed by the imaging detector 10, after being processed, are presented on a monitor oscilloscope 20. A duplicate image is produced on a corresponding oscilloscope, not shown, which is photographed by a color camera mechanism 22.

The signals developed by the imaging detector initially take the form of analog signals, which are converted to digital signals. These digitalized signals are then fed through appropriate interfacing circuitry to a digital computer 24, which may take the form of a PDP8/L Digital Computer manufactured by Digital Equipment Corporation. The signals are then stored in the computer 24 where the signals may be modified if desired. These stored signals are then converted back to analog form and are then applied to the monitor oscilloscope 20 a storage or memory oscilloscope 25.

The analog signals, upon being converted to digital form, may be fed into a tape recording console shown generally at 26 for storage and subsequent utilization. The control circuitry for this tape recording console is disclosed in more detail in the above-referenced Patent Application to R. J. Martone et al. The imaging detector 10 and the associated circuitry for converting the electrical signals into digital form is shown and described in more detail in the above-referenced United States Application to R. Hindel et al. A teletypewriter 28 is coupled to the digital computer 14 for controlling the operation of the computer and for varying certain operating parameters within the computer 24.

FIG. 2 illustrates in more detail the image display system 12 as shown in FIG. 1 and which generally comprises a system interface 14 coupled between an imaging detector, such as a gamma ray imaging camera, and the digital computer 24. The imaging detector may take the form of various imaging cameras, such as the Dynacamera, manufactured by Picker Corporation. The system interface 14 is also coupled to the storage oscilloscope 25, the camera oscilloscope 30, and the color camera mechanism 22.

The system interface 14 generally includes an input interface 32 which is coupled to the Dynacamera imaging system. The actual electrical connections may be made at the input terminal or output terminal of the recording mechanism utilized in that system. The input interface 32 is connected to a computer interface 34, which is in turn connected to the digital computer 24. The computer interface 34 is also coupled to a camera interface 36, which is in turn connected to an input interface control 38. The input interface control 38 is connected back to the input interface 32. Also, the camera interface 36 is connected to the storage oscilloscope 25, camera oscilloscope 30 and color camera mechanism 22. Thus, the signals developed by the imaging detector, such as a Dynacamera, are interfaced to a digital computer which is in turn interfaced to various read-out devices. Control of the computer and the overall system program is fed into the computer by the teletypewriter 28.

Reference is now made to FIG. 3 which illustrates in still more detail the image display system 12 which includes a video converter circuit 38, a preprocessor circuit 40, a register circuit 42, and an oscilloscope interface circuit 44. These circuits are interconnected through a plurality of connector blocks J-102, J-103, J-104, J-105, J-106, J-115, J-116, J-117, J-123, J-124, J-125. The connector blocks J-123, J-124, J-125 are then respectively connected to the camera mechanism 22, the memory oscilloscope 25, and the camera oscilloscope 30. The connector blocks J-115, J-116, J-117, are in turn connected to the digital computer 24. The specific electrical connections between these circuits and the corresponding connector blocks are illustrated in more detail in FIGS. 8 through 31.

FIGS. 4 through 7 are functional block diagrams of the circuits within the video converter 38, the preprocessor circuit 40, the register circuit 42, and the oscilloscope interface 44, respectively.

VIDEO CONVERTER CIRCUIT

FIG. 4 illustrates the video converter circuit 38 which generally comprises a video amplifier 46, having its input terminal connected to an imaging detector system and its output circuit connected to a binary "1" detector circuit 48, a binary "0" detector circuit 50, and a horizontal synchronizing detector circuit 52 The output terminals of the binary "1" and the binary "0" detector circuits are connected to the input terminals of a data flop circuit 54. The output terminal of the data flop circuit 54 is connected to the register circuit 42.

The output terminal of the horizontal synchronizing detector circuit 52 is connected through a shift control circuit 56 to the shift synchronizing terminal of the register circuit 42. A master oscillator circuit 58 is coupled to a ring counter 60 having its output terminal connected through an "end of word" detector circuit 62 to the register circuit 42. A reset circuit 64, having its input terminal connected to the oscilloscope interface 44, is connected to the ring counter 60 for resetting the counter upon command from the oscilloscope interface circuit 44.

Thus, video formated information from the imaging detector system is applied to the video amplifier 46, binary "1" detector circuit 48, and binary "0" detector circuit 50, so that the video information is converted into either binary "1" signals or binary "0" signals with respect to some preselected reference level. The horizontal synchronizing detector circuit 52 is responsive to the synchronizing pulses of the video information and provides a shift synchronizing signal which is applied to the register circuit 42. A master oscillator 58 generates a 5-megahertz signal which when applied to the ring counter 60 causes the counter to proceed to step through the various bits of incoming video information. With each step of the ring counter, the incoming video information is sampled to determine the binary level, i.e., a binary "1" or a binary "0" signal. This binary level information is then applied to the register circuit 42.

The ring counter 60 is reset by the shift control circuit 56 to that the horizontal synchronizing signal determines the starting point of the video decoding cycle. The "end of word" detector circuit 62 detects the completion of a word and the signal developed by this circuit is employed to reset the circuits in the register 42.

PREPROCESSOR CIRCUIT

FIG. 5 illustrates the preprocessor circuit 40 which generally comprises an input buffer circuit 66 connected to an address calculator circuit 68, which is in turn connected to an output gate circuit 70. The output gate circuit 70 is coupled through an output line driver circuit 72 to the digital computer 24. The input buffer circuit 66 is also connected directly to the output gate 70, and is also connected through an "invalid input word" detector circuit 74 to the output gate 70.

A computer transfer control circuit 76 is coupled to the computer 24 and has output terminals which are connected to the output gate circuit 70, a real-time clock circuit 78, and a data flag and buffer circuit 80. The data flag and buffer circuit 80 is connected to the input buffer circuit 66, and the real-time clock circuit 78 is connected to the computer 24.

Thus, the input buffer circuit, which includes RS-type flip-flops, stores the input data of a form of 16 bit words. The data flag and buffer circuit provides a signal upon the completion of the reception of data.

When the transfer of information is complete, the data flag and buffer circuit prevent the RS-type flip-flops in the input buffer stage from being actuated again. In other words, at this time the information is locked up and stored in the input buffer, and is then applied to the address calculator circuit 68. The address calculator circuit 68 performs the function of calculating by binary logic the memory address for the stored information. This circuit generally provides the mathematical operation of:

Memory Address = $3,000_{octal}$ + X (truncated by one bit) + 50Y (truncated by one bit)

The information from the address calculator is then transmitted directly to the output gate.

Simultaneously with the transfer of information from the input buffer 66 to the address calculator 68, the channel information and the truncated bit information are applied directly to the output gate 70.

REGISTER CIRCUIT

Reference is now made to FIG. 6 which generally illustrates the register circuit 42. This circuit is comprised of a scaler register circuit 82 which is connected through a gate circuit 84 to a serial-to-parallel register 86. The serial-to-parallel register 86 is connected through a gate circuit 88 to a data register 90, and the data register 90 is connected to a digital-to-analog converter 92. The digital-to-analog converter 92 is connected to an X analog amplifier 94 and a Y analog amplifier 96. The output terminals of these amplifiers are connected to the X and Y terminals of the oscilloscopes 25, 30.

A converter power supply regulator 98 is connected to the analog amplifiers 94, 96 and the analog-to-digital converter 92, to provide a regulated voltage signal for these circuits. The scaler register 82 is connected to the oscilloscope interface 44, and a preset terminal of the scaler register is connected to a reset circuit in the oscilloscope interface 44. The gate circuits 84, 88, and the serial-to-parallel register 86 are connected to the video converter 38, and the data register 90 is connected to the preprocessor circuit 40.

Thus, as serial data is shifted out of the video converter circuit 38, it is strobed into the scaler register 82. When the complete word is in the scaler register 82, the information is transferred from the scaler register 82 to the data register in binary logic form. The digital-to-analog converter 92 converts the binary signals to analog form. These signals are then amplified by the analog amplifiers 94, 96. A reset signal is transmitted from the preprocessor circuit 40 to the oscilloscope interface 44, and then to the register circuit 42 to reset the scaler register.

OSCILLOSCOPE INTERFACE

Reference is now made to FIG. 7 which generally illustrates the oscilloscope interface 44 and which generally includes a decoder circuit 110, a control mode storage circuit 112, and a plurality of control circuits 114, 116, 118, 120. More particularly, the decoder circuit 110 is coupled to the computer 24 and to the control mode storage circuit 112. The storage circuit 112 is coupled to a camera control circuit 114, a camera scope control circuit 116, a memory scope circuit 118, and an input interface control circuit 120. The control circuits 114 through 120 are in turn coupled to the oscilloscopes 25, 30 and the color camera mechanism 22. A reset circuit 124 is coupled to the computer, the decoder circuit 110, and the control mode storage circuit 112.

Thus, control signals from the computer 24 are applied to the decoder circuit 110, where they are then decoded and applied to the mode storage circuit 112. The information stored in the mode storage circuit 112 controls the unblanking of either the memory oscilloscope 25 or the camera oscilloscope 30.

The camera control circuit 114 generates a series of stepping pulses for actuating a stepping motor in the color camera mechanism 22, as well as signals to actuate the shutter mechanism in the camera mechanism. Also, this circuit is responsive to the position of a color wheel in the camera mechanism 22 for determining when the color wheel is in a "home" position. The memory scope control circuit 118 provides the function of erasing an image that is presently being displayed on the memory scope. In addition, this circuit controls the phosphor persistance allotted to the memory scope.

DETAILED DESCRIPTION OF VIDEO CONVERTER CIRCUIT

Reference is now made to FIGS. 8 through 11 which are schematic diagrams illustrating in still more detail the video converter circuit 38. The numerals enclosed within circles designate connections to the corresponding terminals of terminal block J-104 as indicated in FIG. 3 and the underlined letter designations indicate circuit connections between adjacent Figures, i.e., between FIGS. 8 through 11. The same connection designations are maintained through the subsequent descriptions.

Video formated information from the imaging detector system, i.e., digital words each including 14 X and Y location bits and two isotope channel flag bits, is applied to the video input terminal 126. The video input terminal is connected through a capacitor 128, to a pair of series-connected resistors 132, 134. The other terminal of the series-connected resistors 132, 134 is connected to the movable contact of a potentiometer 136. One of the stationary contacts of the potentiometer 136 is connected through a resistor 138 to a positive 12 volt supply source and the other terminal of this potentiometer is connected through a resistor 140 to a negative 6 volt supply source.

The junction point between resistors 132, 134 is connected to the inverting terminal of an operational amplifier 140 and the non-inverting terminal of this amplifier is connected through a resistor 142 to ground. Also connected between the input terminals of the amplifier 140 are a pair of diodes 144, 146, polorized as shown in FIG. 8. The non-inverting terminal of amplifier 140 is also connected through a resistor 140a to one terminal of a capacitor 150. The other terminal of capacitor 150 is connected through a series-connected potentiometer 152 and resistor 154 to terminal (10) of terminal block J-104.

The operational amplifier 140 is connected directly to terminals (69), (70) of the terminal block J-104, through a capacitor 156 to those same terminals, and through a capacitor 158 to the positive 12 volt supply source. A capacitor 160 is coupled between the positive 12 volt supply source and the terminals (69), (70) of terminal block J-106.

The output terminal of amplifier 140 is connected through a resistor 162 to the negative 6 volt supply source, is connected directly to terminal (10) of terminal block J-106, and is connected through a resistor 164 to the inverting input terminal of another operational amplifier 166. A pair of resistors 168, 170 are connected to the stationary terminals of a potentiometer 172, and these series-connected resistors are coupled between the positive 12 volt supply source and the negative 6 volt supply source. The movable contact of potentiometer 172 is connected directly to the non-inverting input terminal of amplifier 166 and through a capacitor 174 to terminals (69), (70) of terminal block J-106. The inverting input terminal of amplifier 166 is also connected through a capacitor 176 to terminals (69), (70), of the terminal block J-106. The operational amplifier 166 is connected directly to the 12 volt supply source, and through a capacitor 178 to terminals (69), (70) of terminal block J-106. A capacitor 180 is coupled between the positive 12 volt supply source and terminals (69), (70) of terminal block J-106.

The output terminal of amplifier 166 is connected through a resistor 180 to the negative 6 volt supply source, and through an inverter 182 to one of the input terminals of an OR gate 184 (FIG. 9). The output terminal of operational amplifier 166 is also connected to an input terminal of an AND gate 186 (FIG. 10). Terminal (34) of terminal block J-106 is connected directly to an input terminal of OR gate 184 and terminal (32) is connected to another input terminal of OR gate 184 and to the reset terminal of a flip-flop 188.

The junction point between capacitor 150 and potentiometer 152 is connected through a series-connected resistor 190 and capacitor 192 to terminals (69), (70) of terminal block J-106. The junction point between resistor 190 and capacitor 192 is connected through a diode 194, polorized as shown in FIG. 8, and a resistor 196, to the output terminal of an operational amplifier 198. The operational amplifier 198 is connected between the positive 12 volt supply source and the negative 6 volt supply source and includes a feedback capacitor 200 coupled to the output terminal of the amplifier. A capacitor 202 is connected between the positive 12 volt supply source and the terminals (69), (70), and a capacitor 204 is connected directly between the negative 6 volt supply source and the terminals (69), (70).

Figure 11:
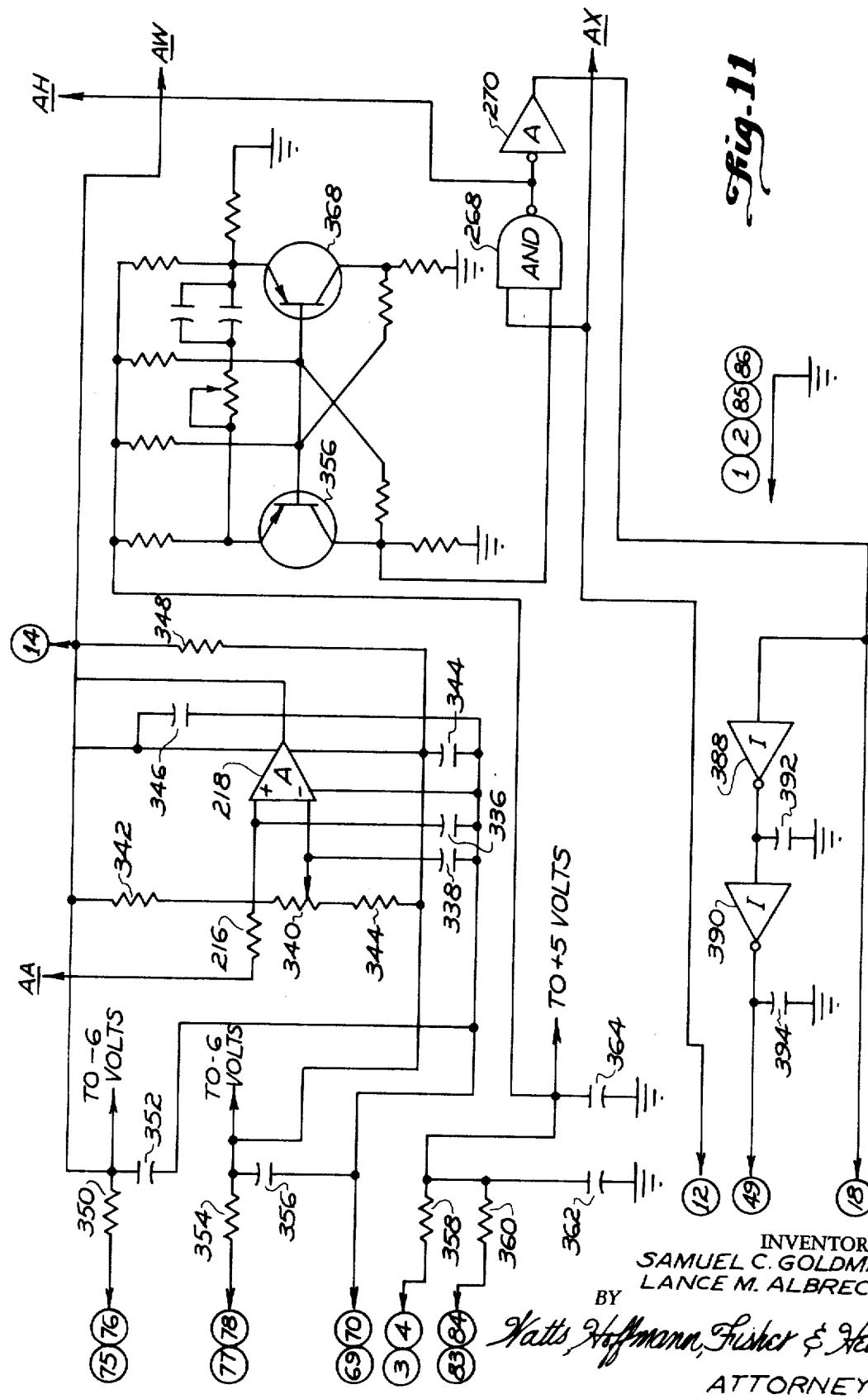
Figure 12:
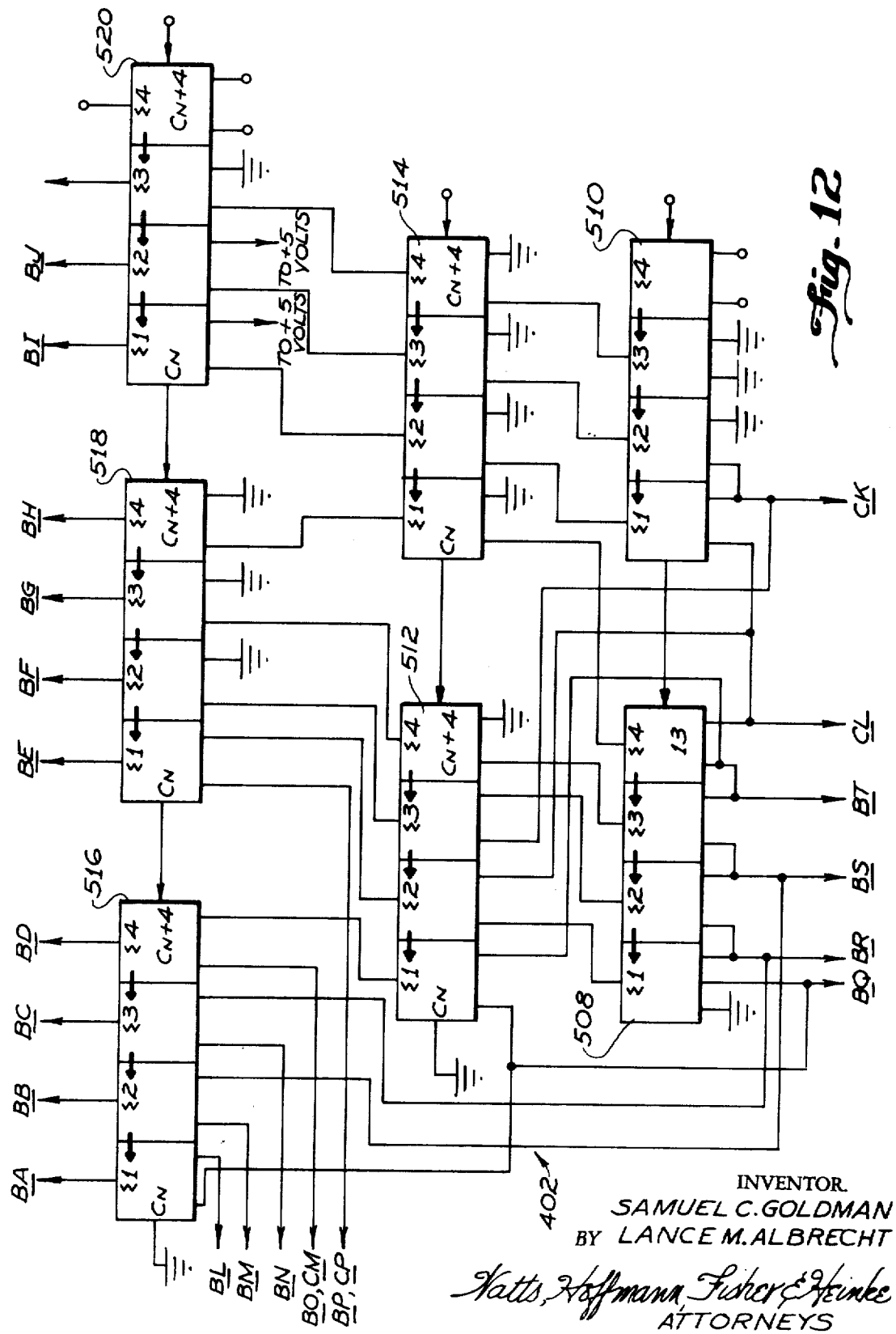
FIGS. 12 through 17 are electrical schematic diagrams illustrating in still more detail the circuitry within the preprocessor circuit as shown in FIG. 5.
Figure 13:
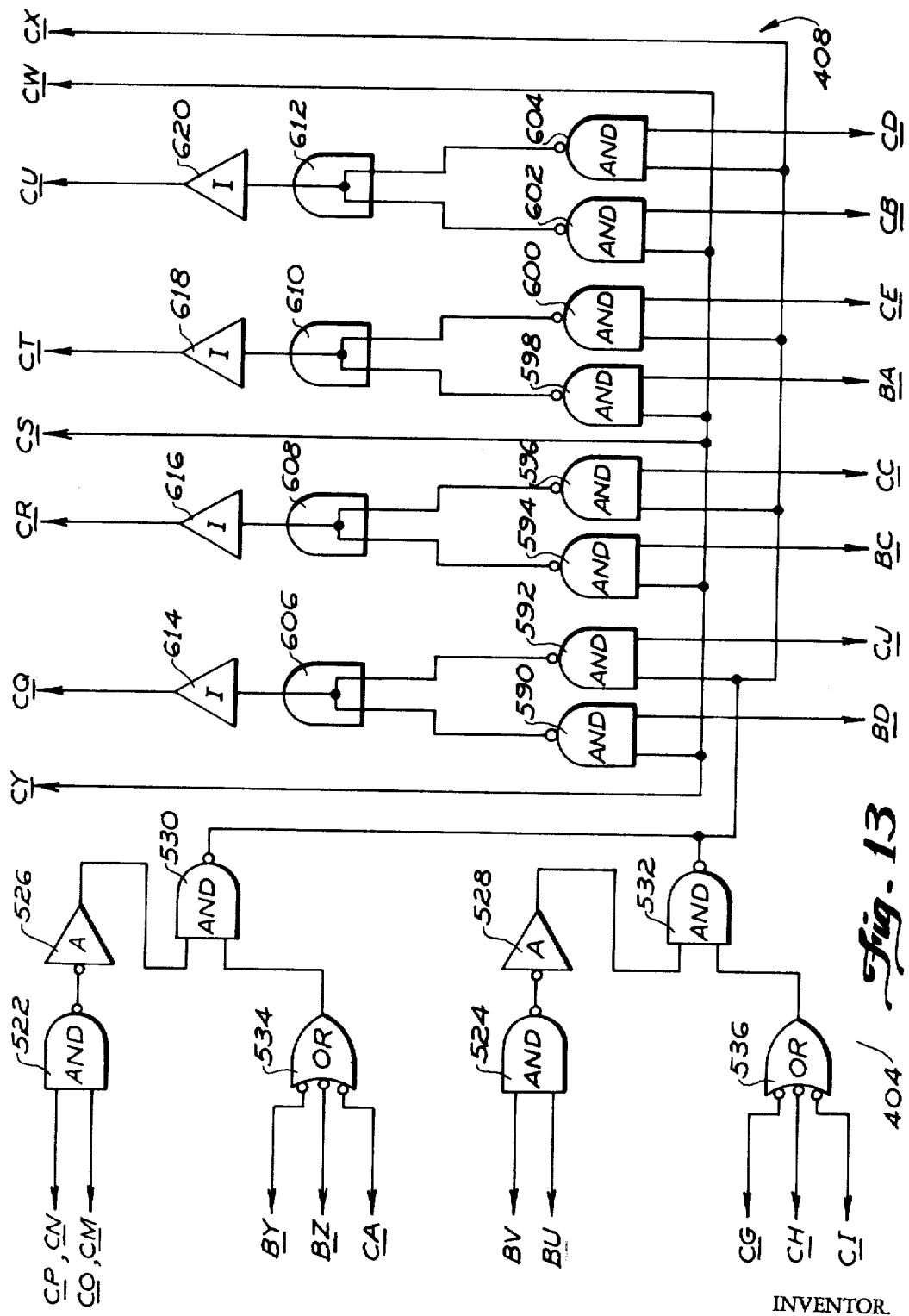
Figure 13A:
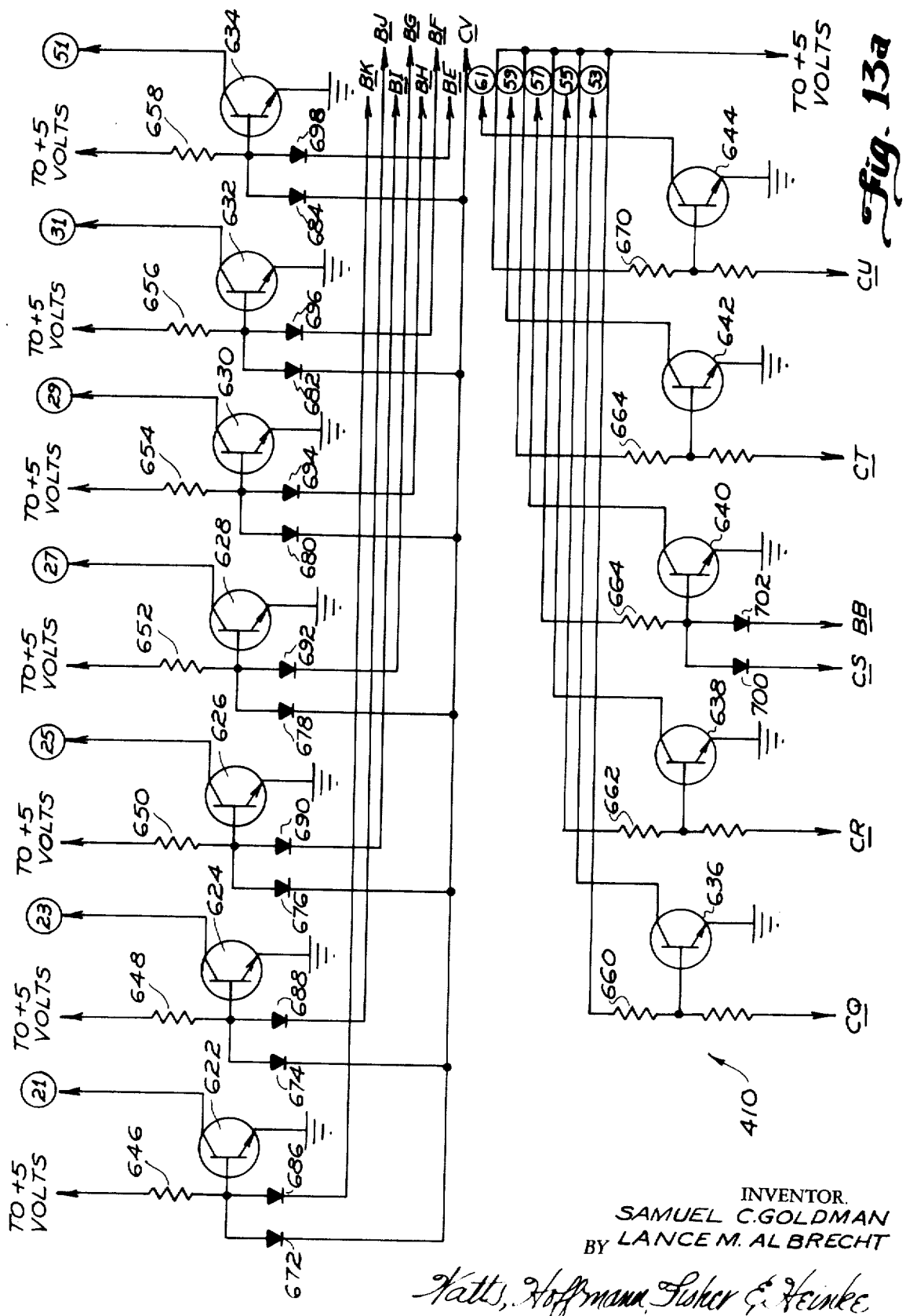

A pair of diodes 206, 208 are connected in parallel, but oppositely polorized, across the input terminals of amplifier 198. The non-inverting input terminal of amplifier 108 is connected through a pair of series-connected resistors 210, 212 to the non-inverting input terminal of another operational amplifier 214. The junction point between resistors 210, 212 is connected through a resistor 216 to the non-inverting input terminal of still another operational amplifier 218 (FIG. 11). The inverting input terminal of amplifier 198 is connected through a resistor 200 to the movable contact of a potentiometer 222. One of the stationary contacts of potentiometer 222 is connected to terminals (69), (70) and the other stationary contact is connected through a resistor 224 to the positive 12 volt supply source.

Connected between the positive 12 volt supply source and the negative 6 volt supply source are a pair of series-connected resistors 224, 226 and a potentiometer 228. The movable contact of potentiometer 228 is connected to the inverting terminal of amplifier 214, and is also connected through a capacitor 230 to the terminals (69), (70). The non-inverting input terminal of amplifier 214 is also connected through a capacitor 232 to the terminals (69), (70) of terminal block J-106.

The operational amplifier 214 is connected between the positive 12 volt supply source and the negative 6 volt supply source and is connected directly to terminals (69), (70). A capacitor 234 is connected between the negative 6 volt supply source and the terminals (69), (70), and a capacitor 236 is connected between the positive 12 volt supply source and those terminals.

The output terminal of operational amplifier 214 is connected through a resistor 238 to the negative 6 volt supply source and is also connected to the input terminal of an inverter 240. The output terminal of inverter 240 is connected directly to the "reset" terminal of flip-flop 188 (FIG. 9).

The output terminal of OR gate 184 is connected through an amplifier 242 to the "toggle" terminals of twelve flip-flops 244, 246, 248, 250, 252, 254, 256, 258, 260, 262, 264, 266. The junction point between OR gate 184 and amplifier 242 is connected directly to the junction point between an AND gate 268 and an amplifier 270. A "set" terminal of flip-flop 188 is connected to terminal (34) of terminal block J-106, the S terminal of this flip-flop is connected directly to ground, the C and "1" terminals are connected to S terminal of a flip-flop 272, and the "0" terminal of flip-flop 188 is connected to C terminal of flip-flop 272. Also, the "toggle" terminal, "1" terminal, "0" terminal of flip-flop 272 are respectively connected to terminals (51), (57), and (55) of terminal block J-106.

The other input terminal of AND gate 186 is connected to the input terminal of an inverter 274 having its output terminal connected in common with the output terminal of an AND gate 276 to the input terminal of an OR gate 278. One of the input terminals of AND gate 276 is connected to "0" terminal of flip-flop 244, and the other input terminal of AND gate 276 is connected in common to the S terminal of flip-flop 244 and the "0" terminal of flip-flop 266. The OR gate 278 is connected in an RS-type flip-flop configuration with another OR gate 280 and the remaining input terminal of that OR gate is connected to the output terminal of an inverter 282. The input terminal of inverter 282 is connected to the "1" terminal of the flip-flop 254. Also, the output terminal of OR gate 278 is connected to one of the output terminals of an RS-type flip-flop 286. The output terminal of AND gate 284 is connected directly to terminal (50) of terminal block J-106.

Each of the "toggle" terminals of flip-flops 244 through 266 are connected in common to the output terminal of amplifier 242. The "1" and "0" terminals of each of these flip-flops are respectively connected to the S and C terminals of the following flip-flop. In addition, the "C1" and "C2" terminals of flip-flop 244 are respectively connected to the "1" terminals of flip-flops 264, 266. The "reset" terminals of each of the flip-flops 244 and 266 are connected in common to the output terminal of an inverter 288. The "1" terminal of the flip-flop 244 and an input terminal of flip-flop 254 are connected directly to one of the input terminals of an AND gate 290, the "0" terminal of flip-flop 246 is connected to one of the input terminals of AND gate 290, the "0" terminal of flip-flop 256 is connected to one of the input terminals of an OR gate 292, and the "1" terminal of flip-flop 258 is connected to the other input terminal of OR gate 292.

The output terminal of OR gate 292 is connected to one of the input terminals of an AND gate 294 having its output terminal connected through a resistor 296 to a positive 5 volt supply source. The output terminal of AND gate 294 is also connected to the junction point between an OR gate 296 and an amplifier 298, which is in turn connected to terminal (58) of terminal block J-106. One of the input terminals of OR gate 296 is connected to the input terminal of an inverter 300 having its output terminal connected to terminal (47) and the input terminal of this inverter is also connected to the output terminal of AND gate 290. The other input terminal of OR gate 296 is connected in common to the S and "0" terminals of a flip-flop 302. The "toggle" terminal of flip-flop 302 is connected directly to the output terminal of an OR gate in the RS-type flip-flop 286, and the "1" and C terminals of the flip-flop 302 are connected in common. Finally, the "reset" terminal of flip-flop 302 is connected to the junction point between an amplifier 304 and an AND gate 306.

The output terminal of amplifier 298 is connected through a capacitor 308 to ground and to an amplifier 310. The output terminal of amplifier 310 is connected through a capacitor 312 to ground and through an amplifier 314 to terminal (35) of terminal block J-106. The other input terminal of AND gate 294 is coupled to the other input terminal of OR gate 184 and to terminal (27) of terminal block J-106.

In addition, the input terminal of the other OR gate in RS-type flip-flop 286 is connected in common to the output terminal of an inverter 316, the "reset" terminal of the flip-flop 272, and the output terminal of an inverter 318. The input terminal of inverter 316 is connected to the other input terminal of AND gate 306, and the input terminal of inverter 318 is connected to the input terminal of an inverter 320 having its output terminal connected to the junction point between inverter 304 and AND gate 306.

The input terminal of amplifier 320 is also connected to the input terminal of an inverter 322 having its output terminal connected to the output terminal of an inverter 324. In addition, the input terminal of inverter 320 is also connected to one of the input terminals of the AND gate 268.

The junction point between the output terminals of inverters 322, 324, are connected through a capacitor 326 to the base of NPN transistor 328 having its base connected through a resistor 330 to the positive 5 volt supply source, its collector connected through a resistor 332 to that voltage supply source and its emitter connected directly to ground. In addition, a resistor 334 is connected between the junction point between inverter 322 and 324 and the positive 5 volt supply source. Finally, the collector of transistor 328 is connected directly to the input terminals of inverters 288, 324.

FIG. 11 illustrates the remaining circuitry of the video converter and generally includes the operational amplifier 218 having its non-inverting terminal connected through a capacitor 336 to terminals (69), (70, its inverting input terminal connected through a capacitor 338 to those terminals, and its output terminal connected to the input terminal of inverter 316. The output terminal of amplifier 218 also is connected to terminal (14) of terminal block J-106 and the non-inverting terminal of amplifier 218 is connected to the movable contact of a potentiometer 340 which is connected in series with a pair of resistors 342 and 344 between the positive 12 volt supply source and the negative 6 volt supply source. Amplifier 218 is also connected between the positive 12 volt supply source and the negative 6 volt supply source, and is connected directly to terminals (69), (70) of terminal block J-106. A pair of capacitors 344, 346, are respectively connected between terminals (69), (70) and the negative 6 volt supply source and the positive 12 volt supply source. In addition, the output terminal of amplifier 218 is connected through a resistor 348 to the negative 6 volt supply source.

The positive 12 volt supply source is connected through a resistor 350 to terminals (75), (76), and through a capacitor 352 to terminals (69), (70). Similarly, the negative 6 volt supply source is connected through a resistor 354 to terminals (77), (78), and through a capacitor 356 to terminals (69), (70) of terminal block J-106. The positive 5 volt supply source is connected to a common point between a pair of resistors 358, 360 having their other terminals respectively connected to terminals (3), (4), and terminals (83), (84) of terminal block J-106. The positive 5 volt supply source is also connected through a pair of parallel-connected capacitors 362, 364 to ground.

A bistable multivibrator comprised of a pair of transistors 366, 368 and the associated circuitry provides a constant frequency signal which is applied to the other input terminal of AND gate 268. Amplifier 270 has its output terminal connected through a pair of series connected inverters 388, 390 which have their output terminals coupled to terminal (49) of terminal block J-106. The output terminal of amplifier 270 is also connected to terminal (18) of terminal block J-106 and the output terminals of inverters 388, 390 are respectively connected through capacitors 392, 394 to ground. Finally, terminals (1), (2), (85), (86) of terminal block J-106 are connected directly to ground.

Thus, the amplifier 140 and its associated circuitry provides the function of a playback amplifier, the amplifier 166 and its associated circuitry discriminates and separates binary "1" signals, the amplifier 214 and its associated circuitry provides the function of discriminating and separating the binary "0" signals, and the flip-flops 244 and 266 are connected in a configuration to provide the function of a ring counter. In addition, the AND and OR gates 276, 278, 280 provide the function of a gating data detector, the amplifier 218 provides the function of a horizontal synchronizing detector, the transistors 366, 368 provide an oscillator for this system, and the AND and OR gates 186, 286 provide a shift control function, and the transistor 328 and its associated circuitry provides the function of a reset control.

Accordingly, the video converter circuit, upon receipt of video formated information, converts this information into binary "1" and binary "0" signals, as well as generates a shift control signal. This circuitry also detects the completion of a word.

DETAILED DESCRIPTION OF PREPROCESSOR CIRCUIT

Reference is now made to FIGS. 12 through 17 which illustrate in still more detail the preprocessor circuit 40 which generally comprises an input buffer 400 comprised of a plurality of RS-type flip-flops, an address calculator 402 which is comprised of a plurality of binary adders an "invalid" location detector 404 which is comprised of gating circuitry, "clocking" circuitry 406 which is comprised of a clock and associated gating circuitry, an output gating circuit 408, and a plurality of output drivers 410.

More particularly, the input buffer circuit 400 includes 32 AND gates 412 through 474 with each pair of corresponding gates being connected so that one of the input terminals of each gate is connected in common with an input terminal of the remaining gates, the output terminal of the first gate is connected to the other input terminal of the second gate, and the other input terminal of the first gate provides the input terminal for the input buffer circuit. The input terminals are then connected to corresponding terminals on terminal block J-102.

The output terminals of each of the AND gates 412 through 474 are connected to the input terminals of corresponding RS-type flip-flops 476 through 506. The output terminals of these RS-type flip-flops, are in turn connected to the address calculator circuit 402 and the "invalid" detector circuit 404.

More particularly, the address calculator circuitry includes seven four-bit full adders 508, 510, 512, 518, 520 each comprised of four complete adding circuits. The adder 510 is connected to the adder 508 and each of the summing terminals in the adders 508, 510 are respectively coupled to the input terminals of the adders 512,514. Similarly, the summing terminals of the adders 512 and 514 are connected to the corresponding terminals of adders 518, 520.

The "invalid" detector circuit 404 generally comprises a pair of AND gates 522, 524 which are respectively connected to a pair of inverters 526, 528. The output terminals of inverters 526, 528 are respectively coupled to one of the input terminals of a pair of AND gates 530, 532. The detector circuit 404 also includes a pair of OR gates 534, 536 having their output terminals respectively coupled to the other input terminals of AND gates 530, 532. The output terminals of the AND gates 530, 532 are connected in common to the output gate circuitry 408 to thereby prevent the passage of an "invalid" signal through the gate circuitry 48.

The "clocking" circuit 406 generally comprises a clock detection flip-flop circuit 538 having its output terminal connected to an AND gate 540 having its output terminal connected in common with the output terminal of another AND gate 542 to the terminal (63) of terminal block J-102. The signal generated by clock circuit 538 is also applied to the input terminal of an AND gate 544 having its output terminal connected to terminal (19) of terminal block J-102. The clock detection circuit 538 is also connected to the input terminal of an RS-type flip-flop comprised of two OR gates 546, 548 having its output terminal connected to the other input terminal of AND gate 544. The input terminals of the flip-flop including OR gates 546, 548 are coupled to the output terminals of a pair of AND gates 550, 552.

Figure 14:
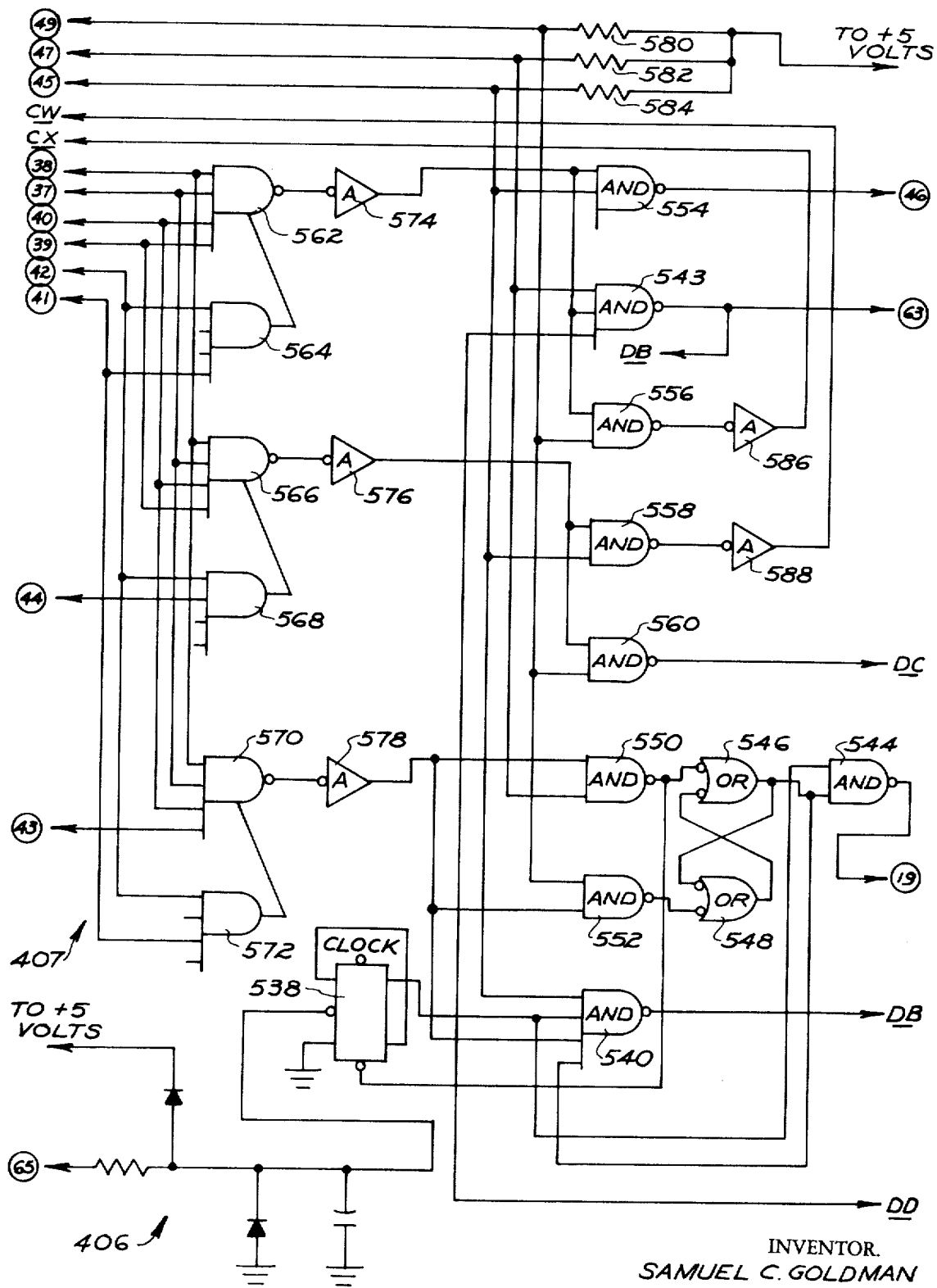
Figure 15:
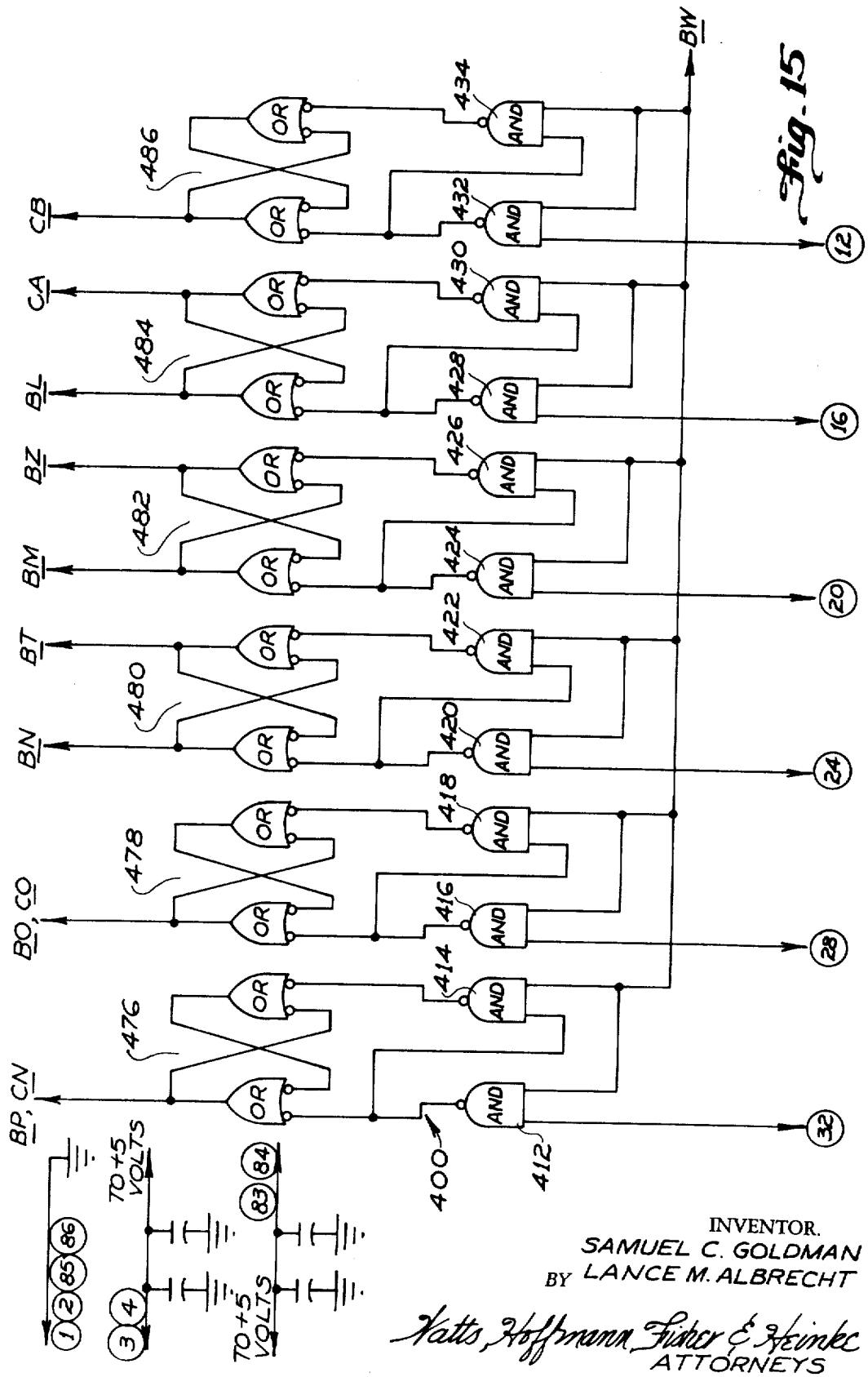
Figure 16:
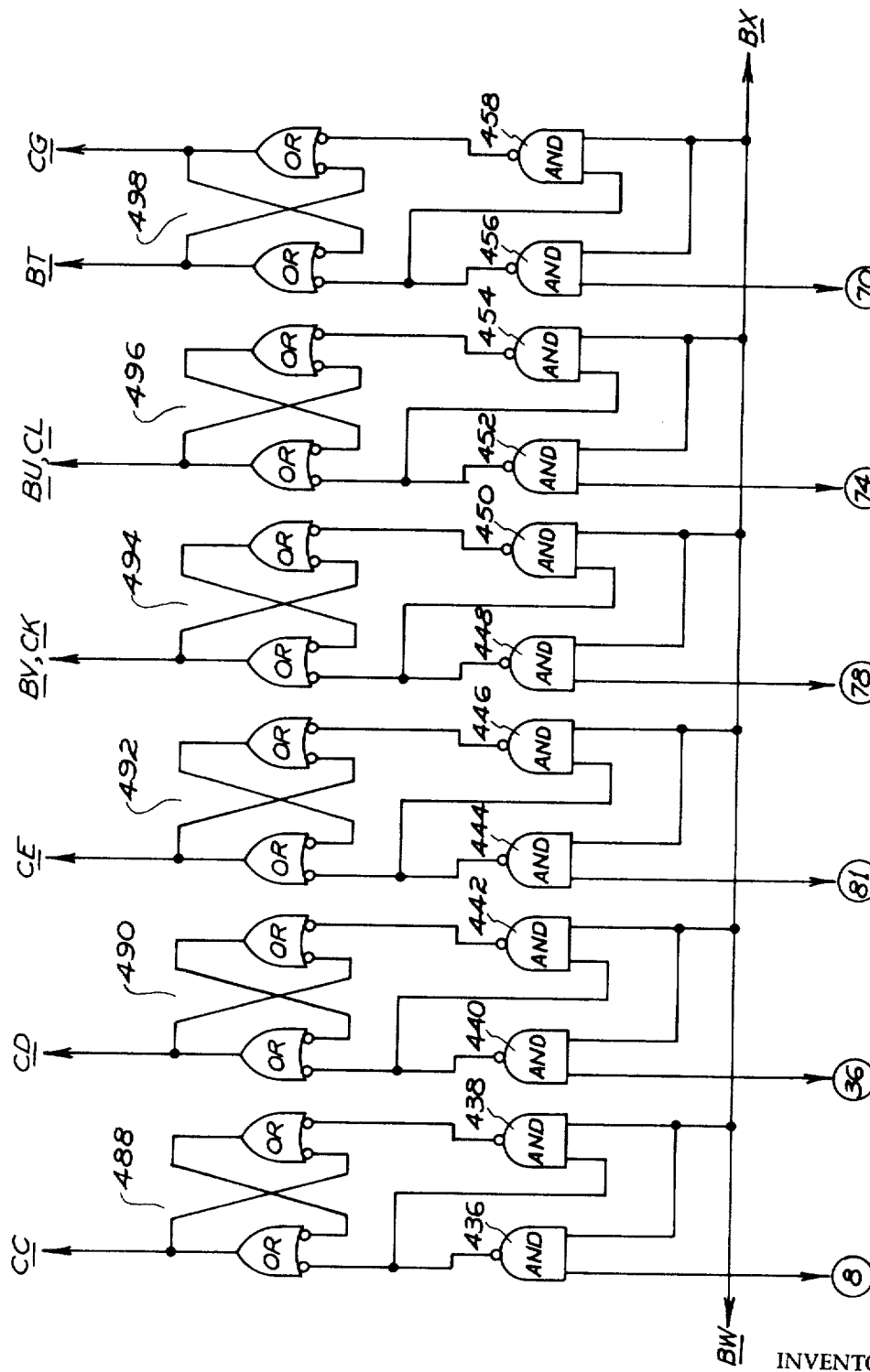
Figure 17:
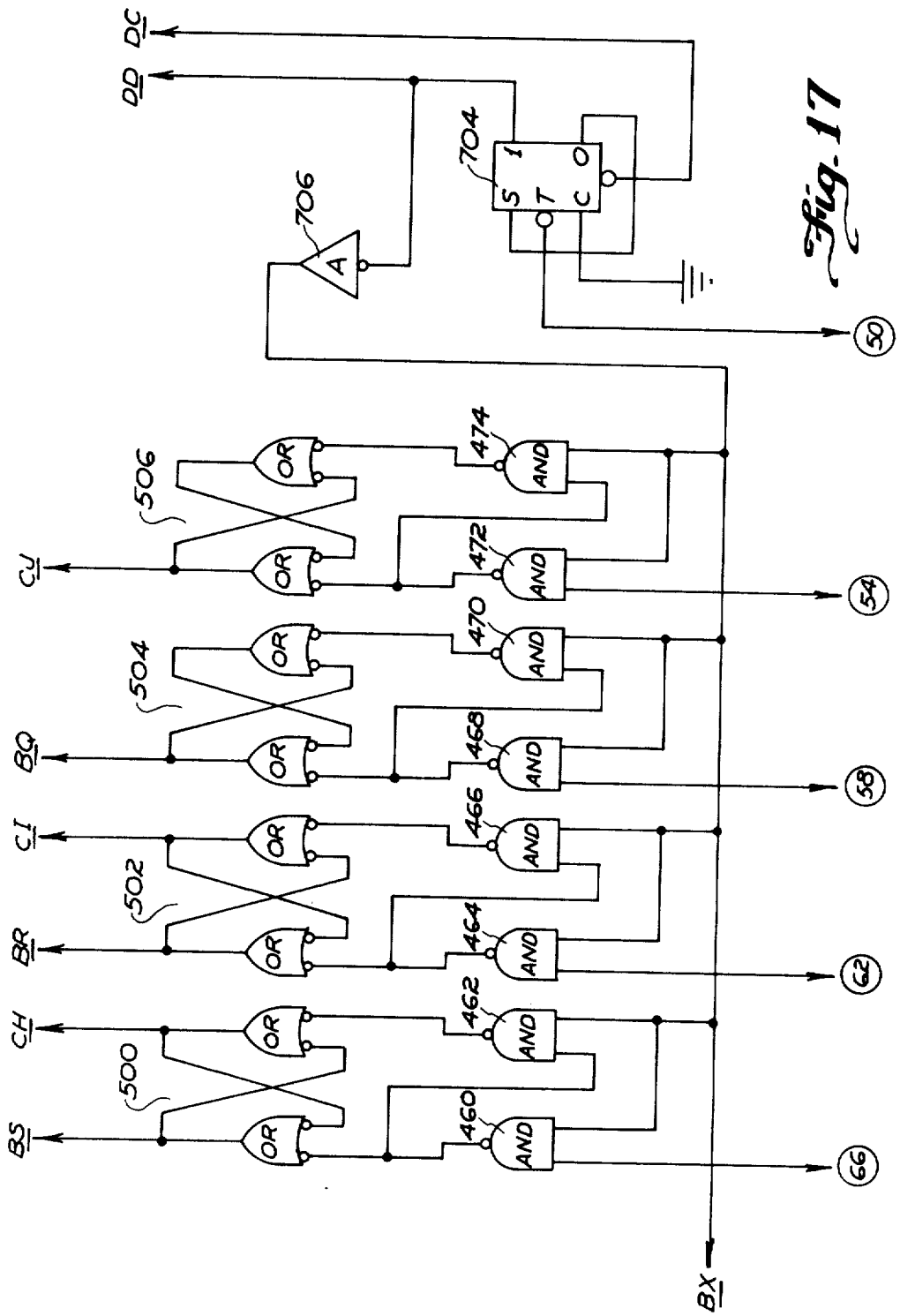
Figure 18:
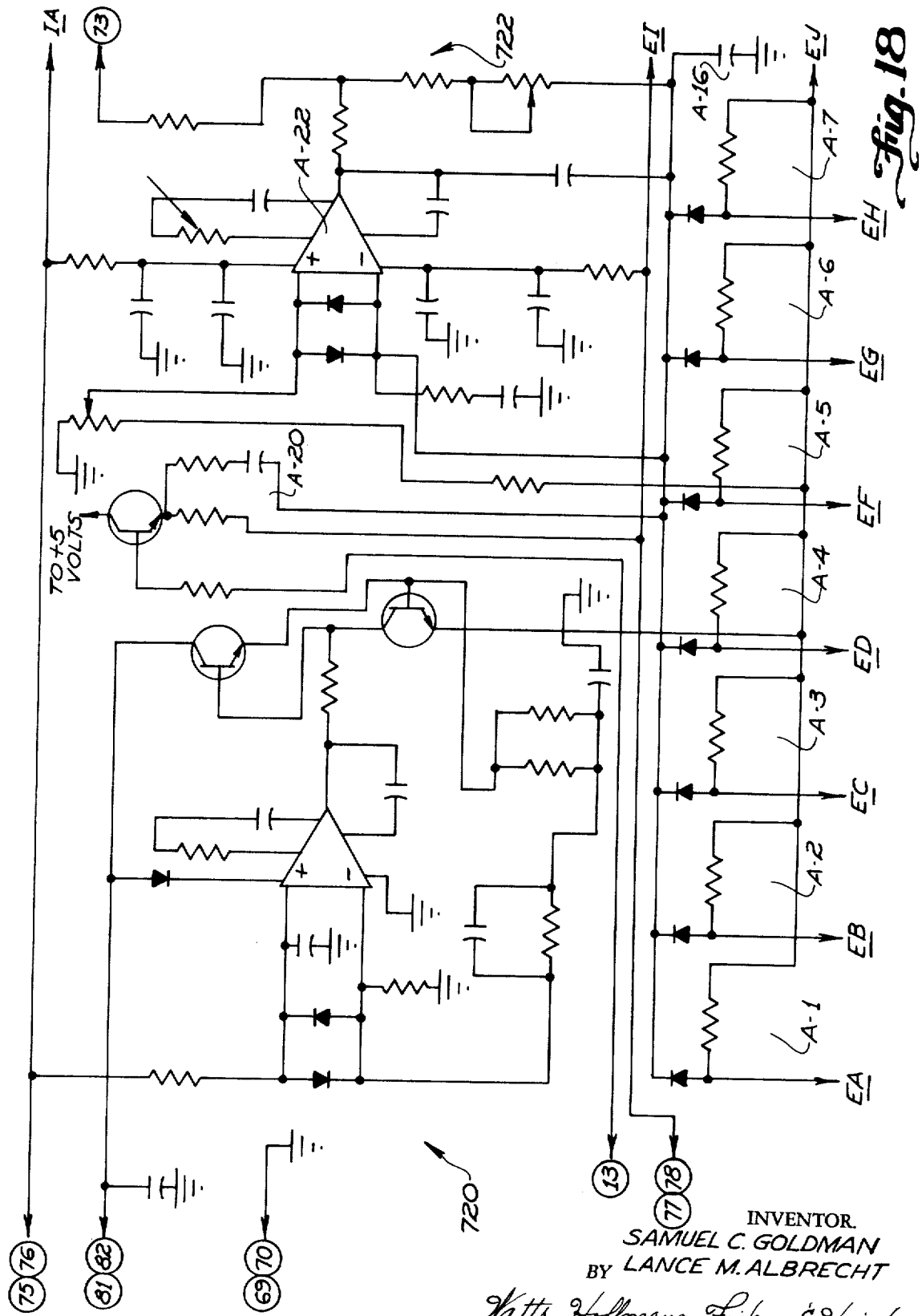
FIGS. 18 through 23 are electrical schematic diagrams illustrating in still more detail the circuitry within the register circuit as shown in FIG. 6.
Figure 19:
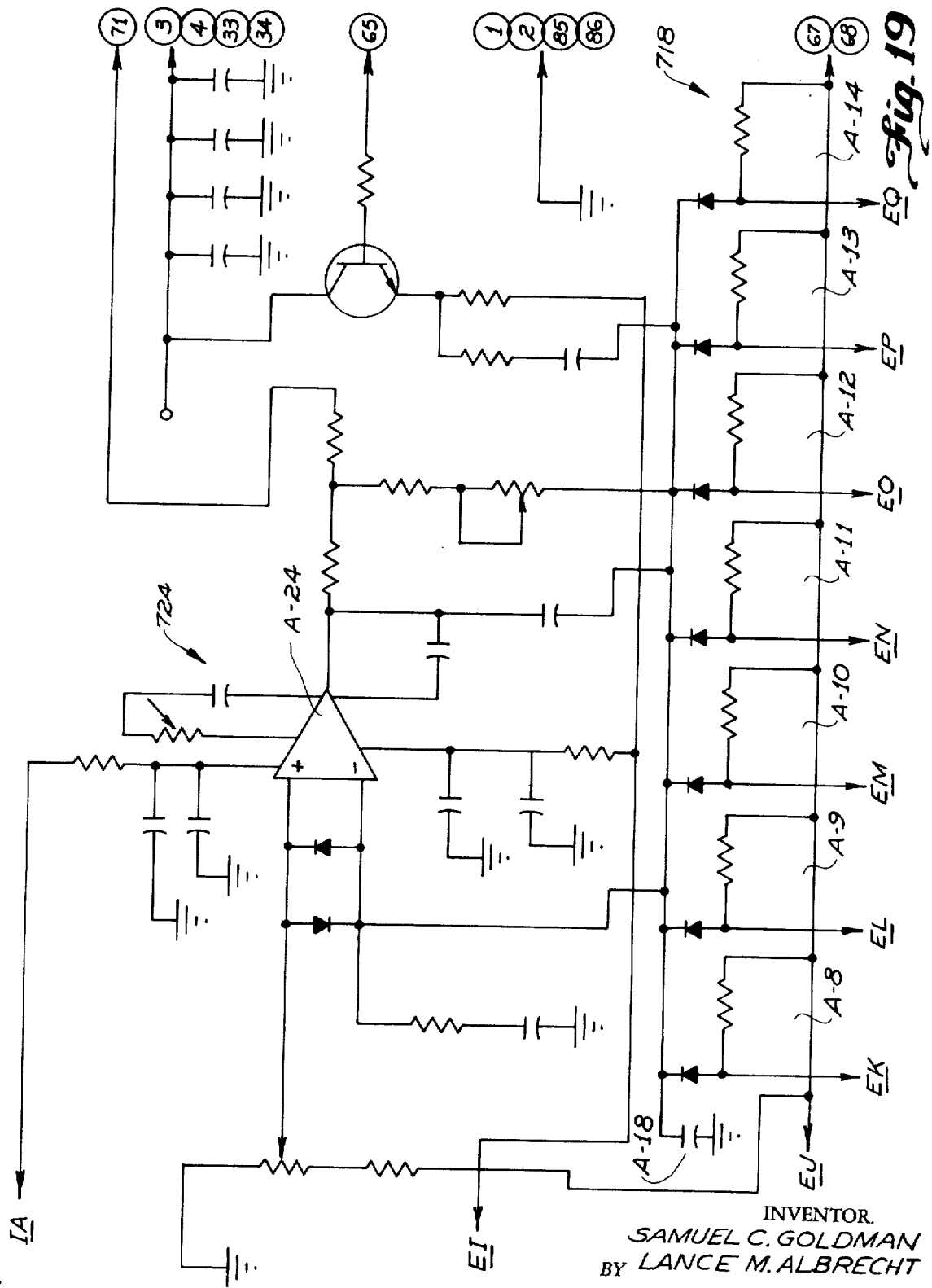
Figure 20:
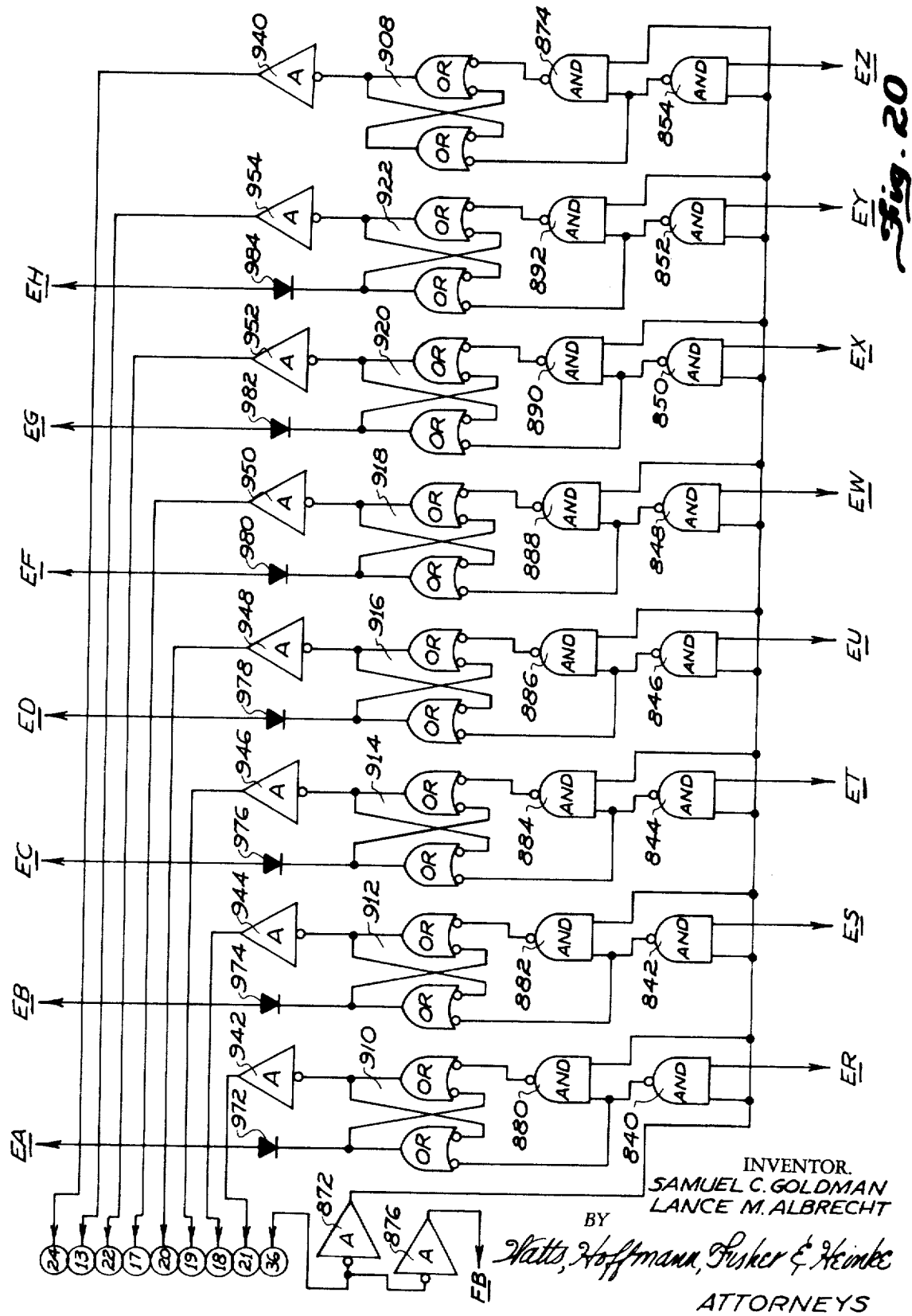
Figure 21:
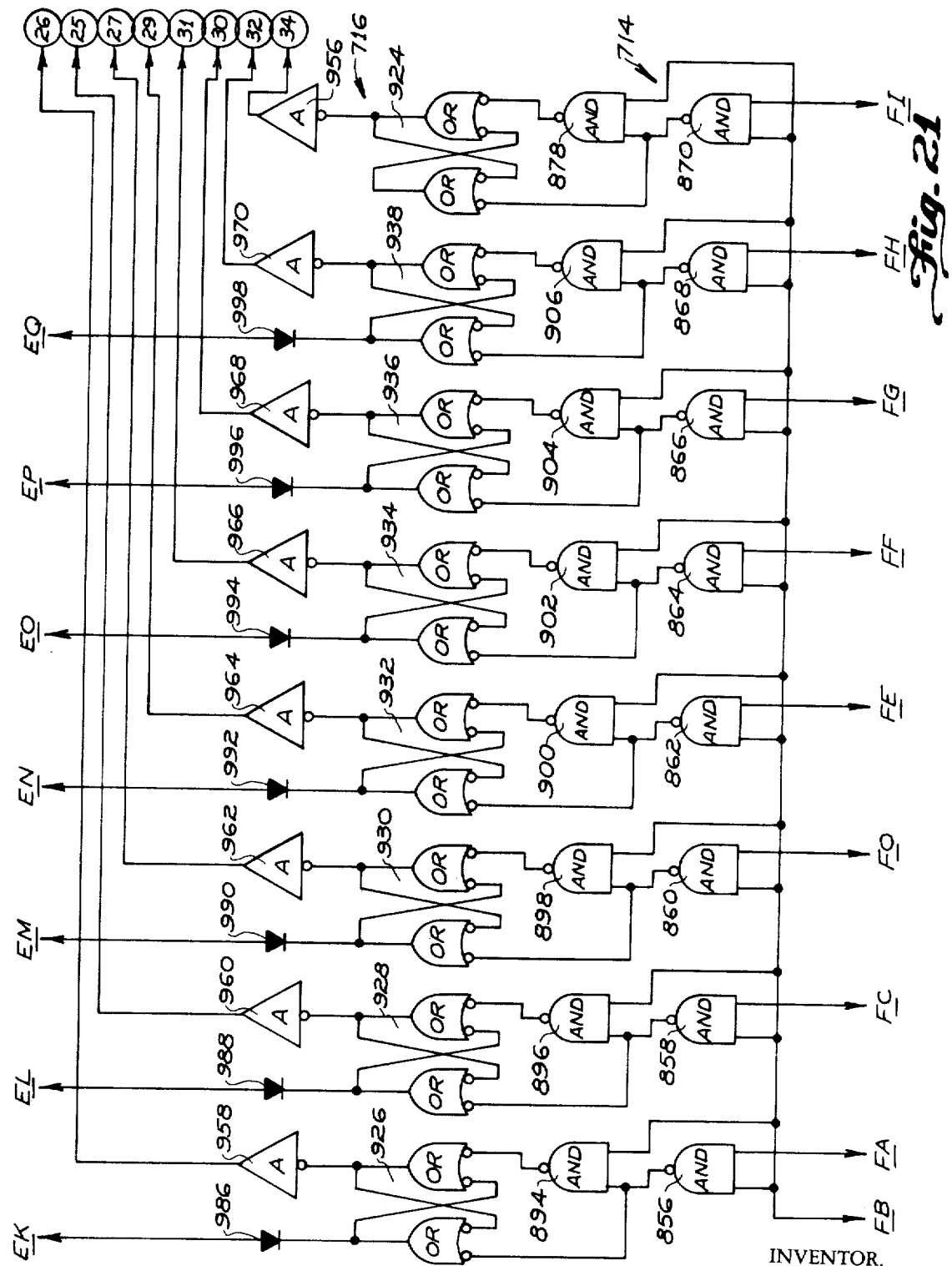
Figure 22:
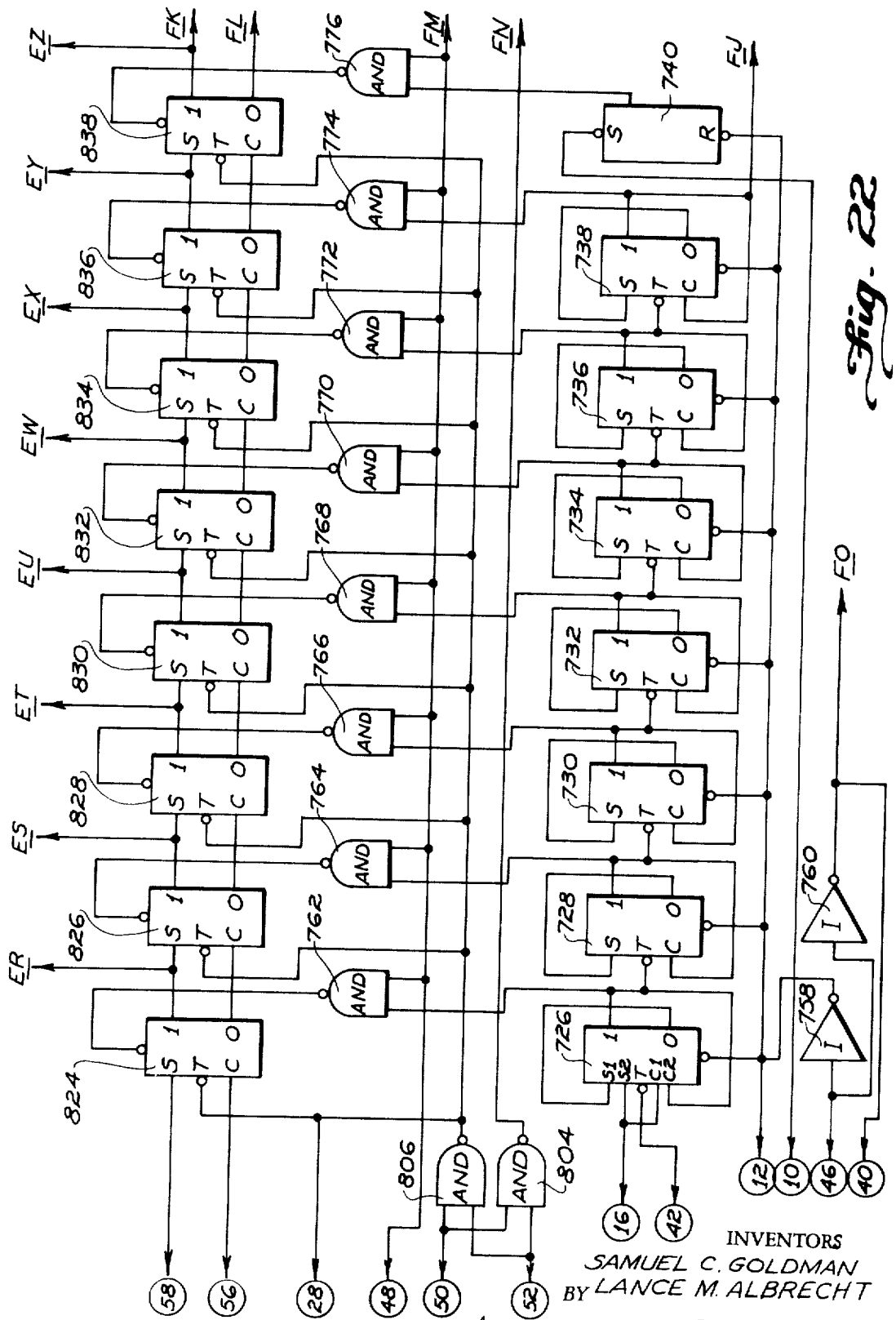
Figure 23:
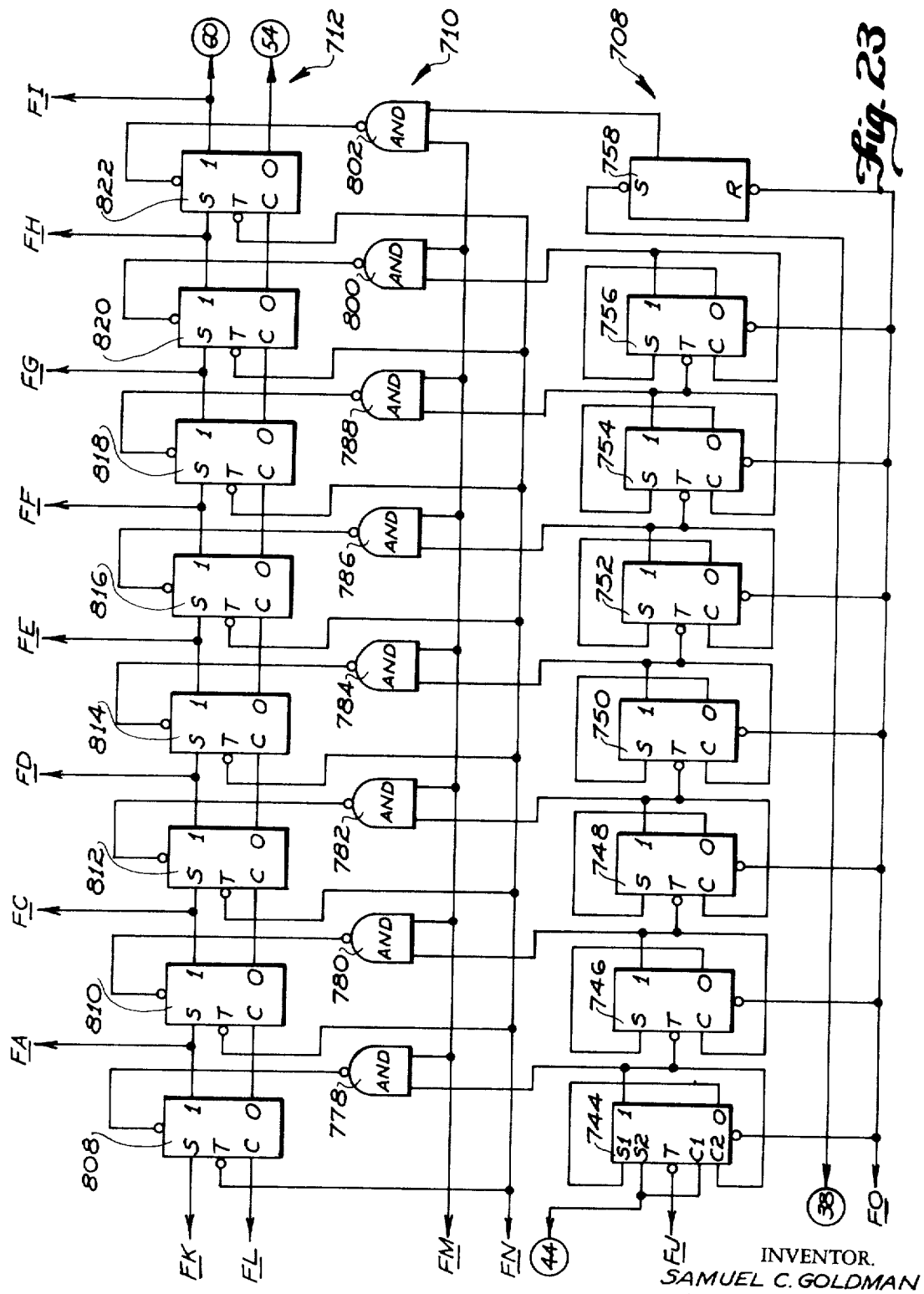

The AND gates 550, 552, as well as five AND gates 543, 554, 556, 558, 560 are included in the transfer control circuit 407. More particularly, the transfer control circuitry 407 includes six gates 562 through 572 having their input terminals connected as shown in FIG. 14 to terminals (37), (38), (40), (41), (42), (43), and (44) of terminal block J-102. The output terminals of gates 564, 568, 572 are respectively coupled to gates 562, 566, 570. In addition, the output terminals of 562, 566, 570 are respectively coupled through inverters 574, 576, 578 to input terminals of the AND gates 554, 558, 550 respectively. The input terminals of AND gates 540, 550, 552, 553, 554, 556, 558, 560 are connected as shown in FIG. 14 to terminals (45), (47), (49) of terminal block J-102 and through the resistors 580, 582, 584 to the positive 5 volt supply source.

The output terminal of AND gate 554 is connected directly to terminal (46) of terminal block J-102, the output terminals of AND gates 556, 558 are respectively connected through inverters 586, 588 to the input terminals of eight !and gates 590 through 604 in the output gate circuit 408. The output terminals of AND gates 590 through 604 are coupled through four gates 606 through 612 and corresponding inverters 614 through 620 to selected ones of the drivers in output drivers circuit 410.

More particularly, the output driver circuit 410 includes 12 NPN transistors 622 through 644 each having their collectors coupled to corresponding terminals of terminal block J-102, their emitters connected directly to ground, and their base terminals connected through resistors 646 through 670 to the positive 5 volt supply source. The base terminals of transistors 622 through 634 are respectively connected through diodes 672 through 684 to selected ones of the input terminals of AND gates 590 through 604. In addition, the base terminals of transistor 622 through 634 are respectively connected through diodes 686 through 698 to indicated ones of the summation terminals of adders 516, 518, 520.

The base terminals of transistors 636 through 644 are connected to the output gate circuitry and the collectors of these transistors are respectively connected to terminals (53), (55), (57), (59), (61) of terminal block J-102. In addition, the base of transistor 640 is connected through a diode 700 to the input terminals of AND gates 590 through 604 and through a diode 702 to a summation terminal of adder 516.

Thus, the input information fed into the preprocessor circuit 40 is stored in the RS-type flip-flops 476 through 506. When transfer of information is complete, a gate display register signal is developed which when applied to the data flag and buffer control circuit signals the computer that preprocessor card has data to be transferred. The adders 508 through 520 then perform through binary logic the calculation:

Memory Address = 3,000 $_{octal}$ + X (truncated by one bit) + 50Y (truncated by one bit)

The information from the address adders 508 through 520 is then transmitted directly to the output gate circuitry 408. Simultaneously with the transfer of information from the input buffer circuit 400 to the address calculator circuit 402, the channel information is applied directly to the output gate circuit 408. This information is then applied to the output terminals through the output driver circuit upon actuation of the corresponding transistors 624 through 644. When the data flag and buffer circuit signals the computer that information is present, the computer selects the isotope channel information then the calculator address information.

DETAILED DESCRIPTION OF REGISTER CIRCUIT

FIGS. 18 through 23 illustrate in still more detail the circuitry of the register circuit 42 which generally includes a scaler register 708, a gating circuit 710, a serial-to parallel register 712, a second gating circuit 714, a data register 716, a digital-to-analog converter 718, a regulated power supply 720, and X amplifier 722, and a Y amplifier 724.

More particularly, the scale register 708 is comprised of 16 D-type flip-flops 726 through 758. The "reset" terminals of flip-flops 726 through 740 are connected in common to the output terminal of an inverter circuit 758 having its input terminal connected to terminal (46) of terminal block J-103. The output terminal of inverter 758 is also connected to terminal (12) of terminal block J-103.

The output terminal of inverter 758 is connected through an inverter 762 to terminal (40) of terminal block J-103 and is also connected to the "reset" terminals of flip-flops 744 through 758. The "toggle" terminal of flip-flop 726 is connected in common to terminal (16) of terminal block J-103. In addition, the "1" terminals of each of the flip-flops 726 through 736 and 744 through 756 are connected to the "toggle" terminal of the following flip-flop, and the "0" terminal of each of these flip-flops is connected back to the S terminal of that flip-flop.

A "set" terminal of flip-flop 740 is connected to terminal (10) of terminal block J-103 and a "set" terminal of flip-flop 758 is connected to terminal (38) of terminal block J-103. The O terminal of each of the flip-flops 726 through 736 and 744 through 754 are connected to the "toggle" terminal of the following flip-flop and, the C and "1" terminals of flip-flop 738 are connected in common to the "toggle" terminal of flip-flop 744. The "C1" and "S2" terminals of flip-flop 744 are connected in common to terminal (44) of terminal block J-103. The "set" terminal of flip-flop 758 is connected directly to terminal (38) of terminal block J-103. Each of the flip-flops 726 through 758 has its "1" terminal connected directly to one of the inputs of 16 AND gates 762 through 802. The other input terminals of each of these AND gates 762 through 802 are connected in common to terminal (48) of terminal block J-103.

A pair of AND gates 804, 806 having their corresponding input terminals connected in common are coupled to terminals (50) and (52), respectively, of terminal block J-103. The output terminal of AND gate 804 is connected to the "toggle" terminal of eight flip-flops 808 through 822 and the output terminal of AND gate 896 is connected to the "toggle" terminals of eight flip-flops 824 through 838. The output of AND gate 806 is also connected to terminal (28) of terminal block J-103.

The S and C terminals of flip-flop 824 are respectively connected to terminals (58) and (56) of terminal block J-103. In addition, the "1" and "0" terminals of flip-flops 824 through 838, and 808 through 822, are respectively connected to the S and C terminals of the following flip-flop. The "set" terminals of flip-flops 824 through 838 are respectively connected to the output terminals of AND gates 762 through 776. Similarly, the "set" terminals of flip-flops 808 through 822 are connected to the output terminals of AND gates 778 through 802. Finally, the "1" and "0" of flip-flop 822 are connected directly to terminals (60) and (54) of terminal block J-103. The "1" terminals of each of the flip-flops 808 through 838 are respectively connected to an associated input terminal of one of 16 AND gates 840 through 870. The other input terminals of AND gates 840 through 854 are connected in common to the output terminal of an output inverter 872 and to one of the input terminals of an AND gate 874. The other input terminals of AND gates 856 through 870 are connected in common to the input terminal of another inverter 876 and to one of the input terminals of an AND gate 878. The output terminal of inverter 872 is connected to one of the input terminals of eight AND gates 874 and 880 through 892. Similarly, the output terminal of inverter 876 is connected to one of the input terminals of eight AND gates 878 and 894 through 906. The other input terminals of AND gates 874 and 880 through 892 are respectively connected to the output terminals of AND gates 854 and 840 through 852. Similarly, the other input terminals of AND gates 878 and 894 through 906 are respectively connected to the output terminals of the AND gates 870 and 856 through 868. The other input terminals of AND gates 874 and 880 through 892 are also connected to one of the input terminals of an RS-type flip-flop 908 through 922. Similarly, the other input terminal of AND gates 878 and 894 through 906 are respectively connected to one of the input terminals of the RS-type flip-flops 924 through 938.

The other input terminal of flip-flops 908 through 922 are respectively coupled to the output terminals of AND gates 874 and 880 through 892. Similarly, the other input terminals of flip-flops 924 through 938 are respectively connected to the output terminals of AND gates 878 and 894 through 906. One of the output terminals of each of the flip-flops 908 through 922 are respectively coupled through inverters 940 through 954 to terminals (24), (21), (18), (19), (20), (17), (22), and (15) of terminal block J-103. Similarly, one of the output terminals of each of the flip-flops 924 through 938 are respectively coupled through inverters 956 through 970 to terminals (34), (26), (25), (27), (29), (31), (30), and (32), respectively, The other output terminals of each of the flip-flops 910 through 922 and 926 through 938 are connected through diodes to the input terminals of one of the 14 digital-to-analog summing networks A-1 through A-14. The output terminals of the summing networks A-1 through A-7 are connected in common through a capacitor A-16 to ground and the output terminals of summing networks A-8 through A-14 are connected through a capacitor A-18 to ground.

The regulated power supply 720 is coupled to the positive 5 volt supply source, to terminals (81) and (82), (75) and (76), (13), (77) and (78), of terminal block J-103. The commonly-connected output terminals from summing networks A-1 through A-7 are connected to an output terminal A-20 of the regulated power supply 720. The output terminals of summing networks A-1 through A-7 are also coupled to the X amplifier 722 which is comprised of an operational amplifier A-22 and its associated circuitry. The output terminal of X amplifier 722 is connected to terminal (73) of terminal block J-103. Similarly, the output terminals of summing networks A-8 through A-14 are connected to the Y amplifier 724 which is comprised of an operational amplifier A-24 and its associated circuitry. The output terminal of Y amplifier 724 is in turn connected to (71) of terminal block J-103.

Thus, the register circuit 42 includes three registers separated by two gating circuits having their outputs fed into a digital-to-analog converter 718. The output signal from the register circuit 42 takes the form of a video signal which is transmitted to the memory scope 25 and camera scope 30. As serial data is shifted into the register card 42 it is strobed into the scaler register 708. Sixteen bits of information are strobed into this register at one time. When the complete word is stored in the shift register 708, a signal is applied to the scaler register to gate this information into the serial-to-parallel register 712.

The information stored in the serial-to-parallel register 710 is then gated into the digital-to-analog converter 718 through a gating circuit 716. The digital-to-analog converter than converts the binary signal to a particular voltage or analog signal which is amplified through the X and Y amplifiers 722, 724.

DETAILED DESCRIPTION OF OSCILLOSCOPE INTERFACE CIRCUIT

Figure 24:
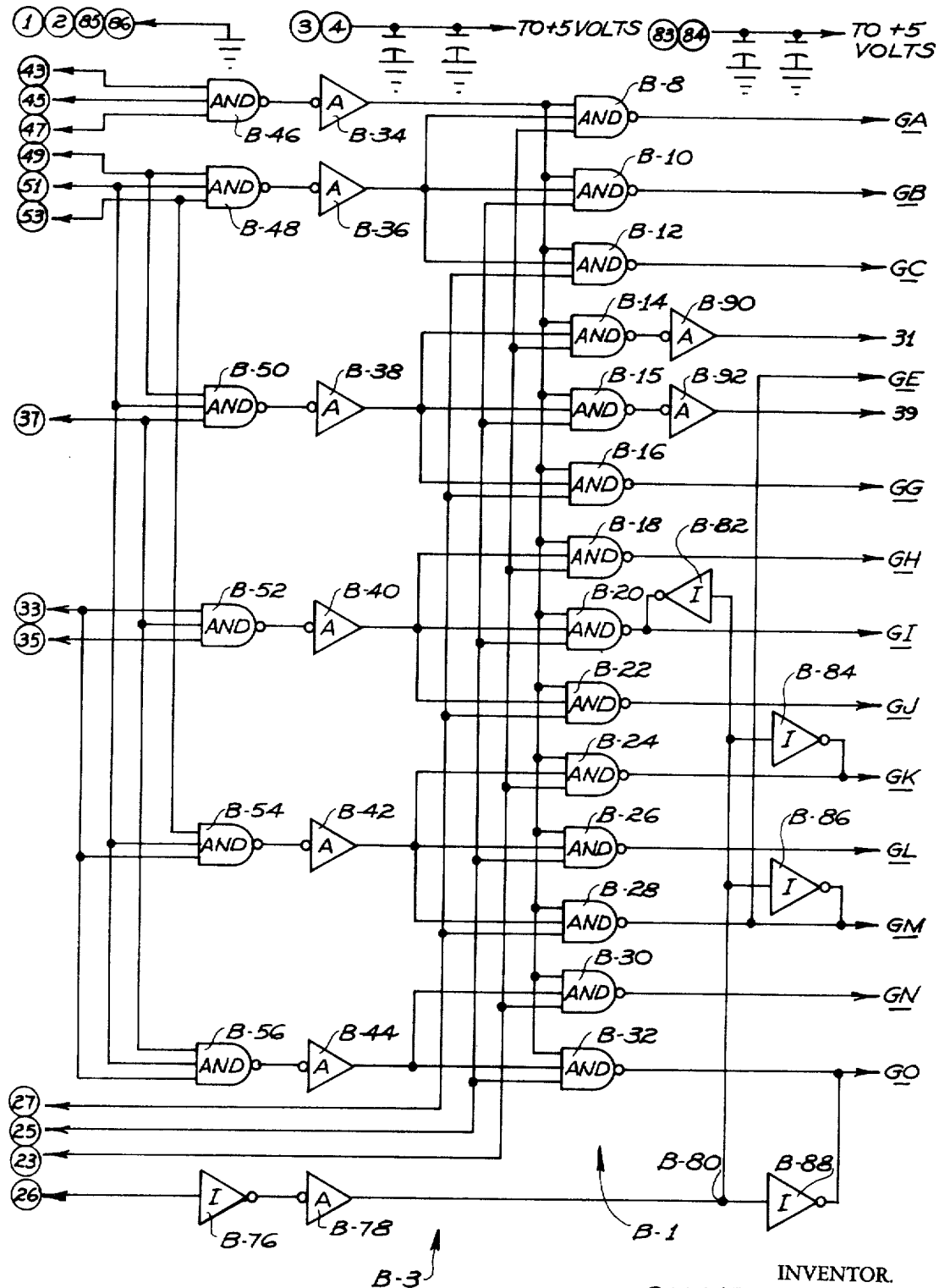
Figure 29:
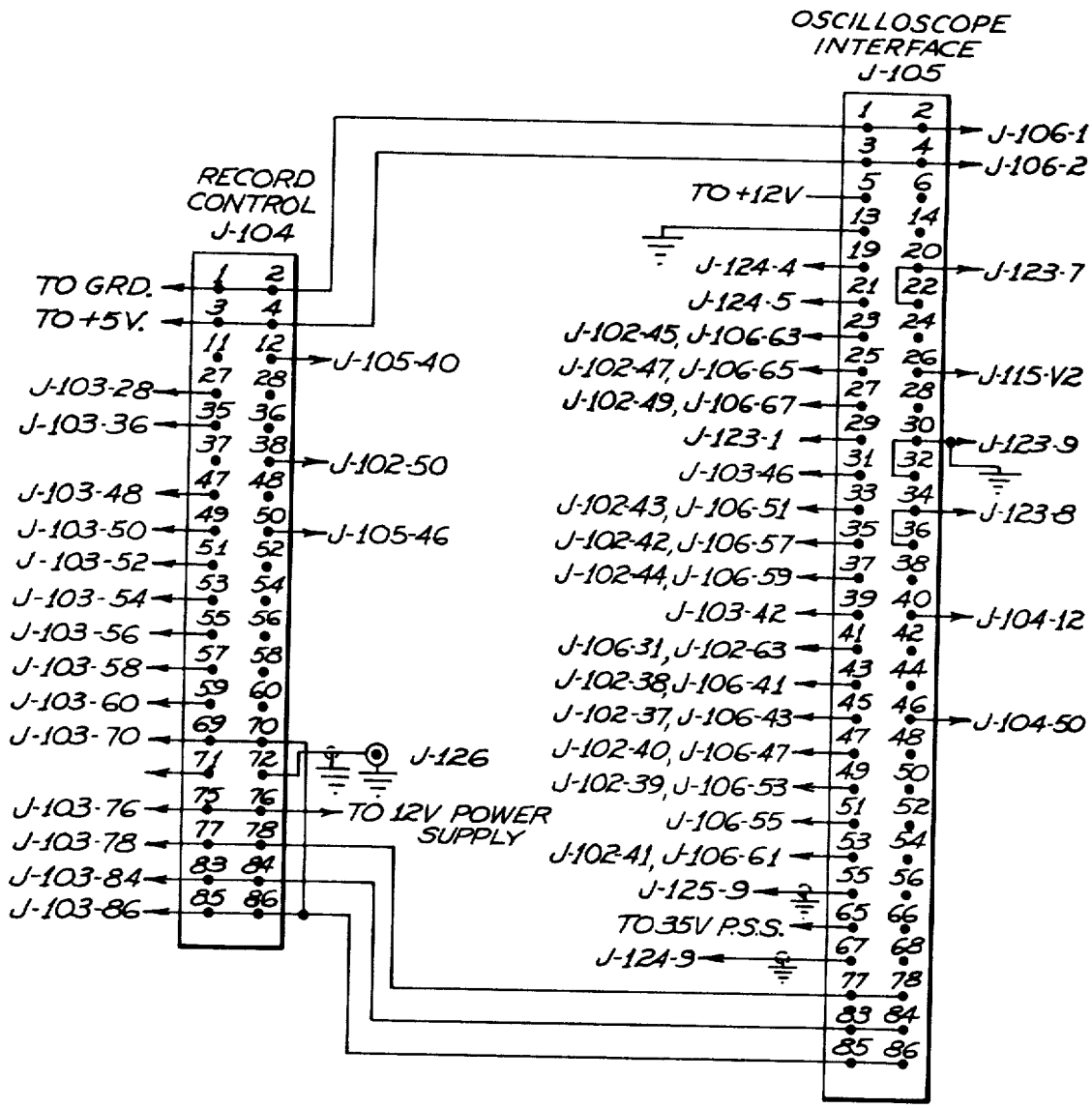
Figure 30:
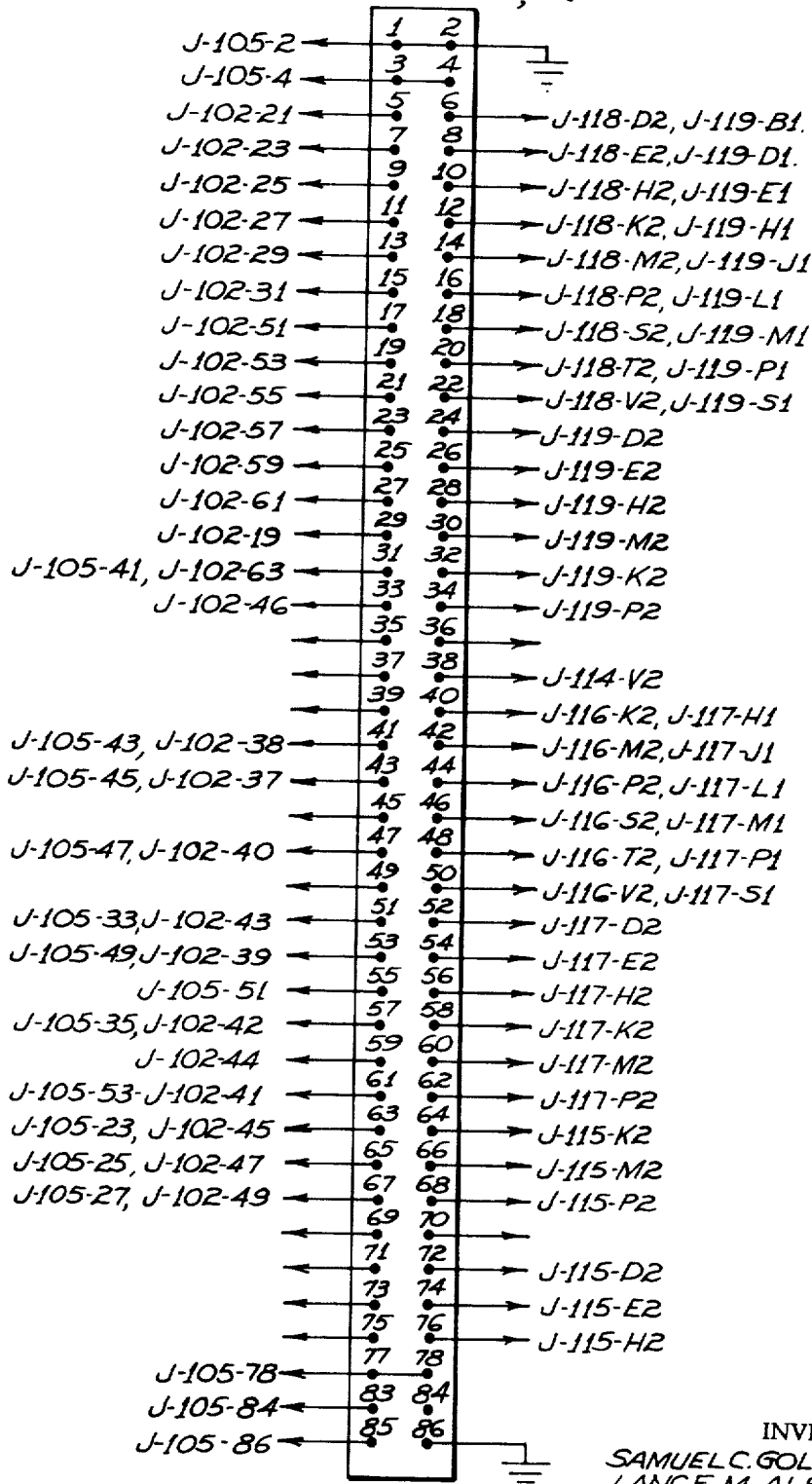
Figure 31:
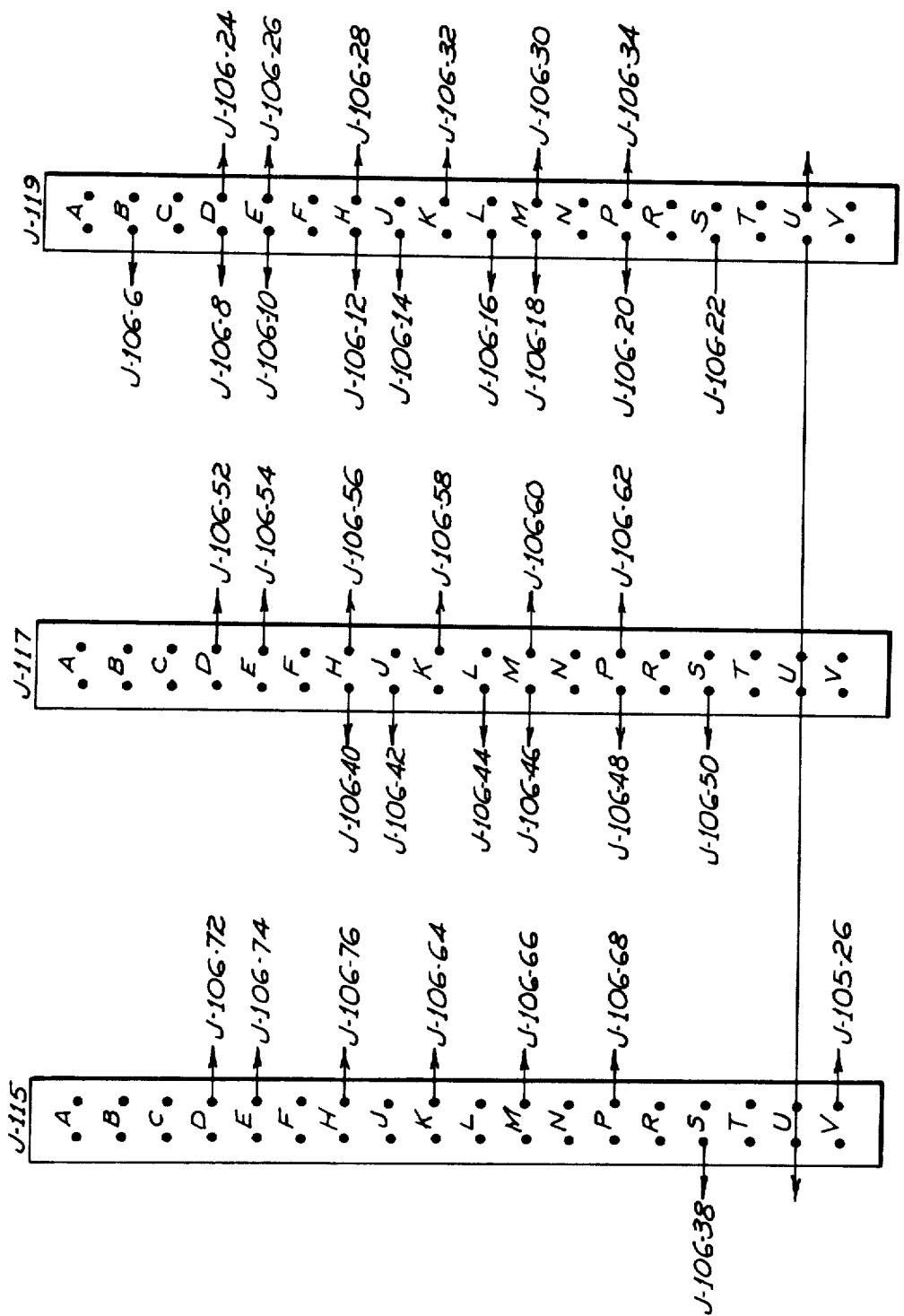
Figure 32:
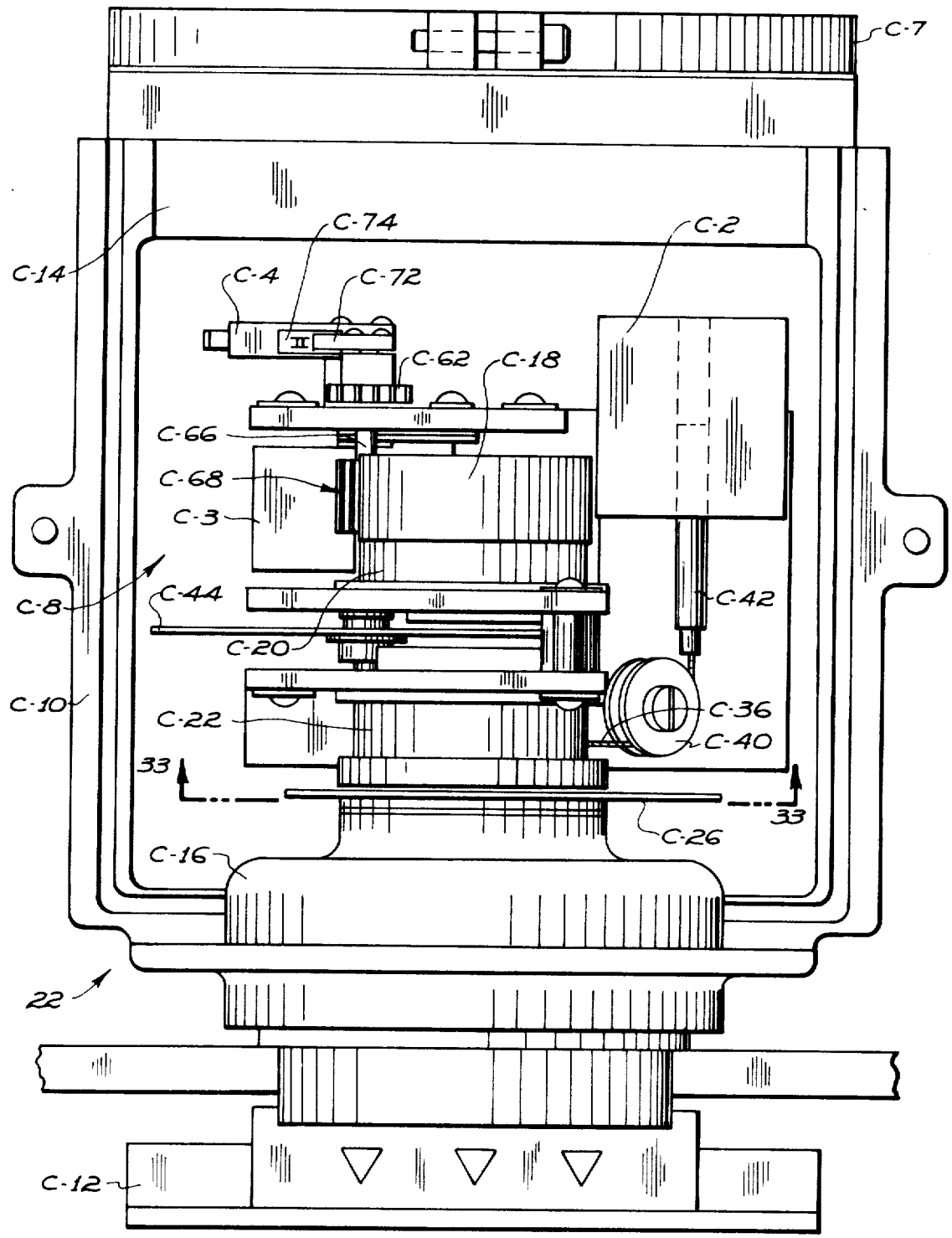

FIGS. 24 through 25a illustrate in still more detail the oscilloscope interface circuit 44 which is generally comprised of an input decoder B-1, a control word storage B-2, a reset circuit B-3, a memory scope control B-4, an input interface control B-5, a camera control B-6, and the remaining portion of the memory scope control B-7.

More particularly, the input decoder B-1 is comprised of 14 AND gates B-8 through B-32 having their input terminals connected as illustrated in FIG. 24. One of the input terminals of AND gates B-8, B-10, B-14, B-20, B-26, and B-32 are respectively connected to the input terminals of six amplifiers B-34 through B-44.

The input terminals of inverters B-34 through B-44 are respectively connected to one of six AND gates B-46 through B-56. The input terminals of AND gates B-46 through B-56 are connected as illustrated in FIG. 24 and are connected to terminals (33), (35), (37), (43), (45), (47), (49), (51), and (53) of terminal block J-106. The output terminals of AND gates B-8, B-10, B-12 and B-28 are connected to the input terminals of a pair of RS-type flip-flops B-58, B-60. Similarly, the output terminals of AND gates B-18, B-20, B-22, B-24 are connected to the input terminals of a pair of RS-type flip-flops B-62, B-64. Finally, the output terminals of AND gates B-26, B-28, B-30, and B-32 are connected to the input terminals of a pair of RS-type flip-flops B-66, B-68. The output terminal of AND gate B-16 is connected through an inverter B-70 to one of the input terminals of an AND gate B-72. The output terminal of AND gate B-72 is connected to terminal (41) of terminal board J-106 and the other input terminal of AND gate B-72 is connected to the output terminal of an inverter B-74. The input terminal of inverter B-74 is connected to terminal (29) of terminal block J-106.

The reset circuitry includes a conductor extending from terminal (26) through an inverter B-76 and an inverter B-78 to a common junction point B-80. Coupled to the junction point B-80 are the input terminals of four inverters B-82 through B-88. The output terminal of inverter B-82 is coupled to the output terminal of AND gate B-20, the output terminal of inverter B-84 is connected to the output terminal of AND gate B-24, the output terminal of inverter B-86 is connected to the output terminal of AND gate B-28, and the output terminal of inverter B-88 is connected to the output terminal of AND gate B-32.

The output terminal of AND gate B-14 is connected through an inverter B-90 to terminal (31) of terminal block J-106. Similarly, the output terminal of AND gate B-14 is connected through an inverter B-92 to terminal (30) of terminal block J-106.

The output terminals of flip-flops B-58, B-60 are connected to the input terminals of a pair of AND gates B-94, B-96. The output terminal of AND gate B-94 is connected through a resistor B-98 to the base of an NPN transistor B-100. The output terminal of AND gate B-96 is connected through an inverter B-102 to a junction point B-104. The input terminal of inverter B-102 is connected to another junction point B-106. A pair of jumper conductors extend from terminals B-104 and B-106 to corresponding terminals B-108 and B-110. The junction point between points B-108 and B-110 is connected through a resistor B-112 to the base of an NPN transistor B-114. The emitter of transistor B-114 is connected to ground and the collector of this transistor is connected through a resistor B-116 to terminal (67) and through a pair of series-connected resistors B-118, B-120 to terminal (65) of terminal block J-106.

The emitter of transistor B-100 is connected directly to ground and the collector of this transistor is connected through a resistor B-122 to terminal (55) and to the junction point between resistors B-118 and B-120. Also connected to the junction point between resistors B-118 and B-120 is a capacitor B-124 and a diode B-126, poled as shown in FIG. 25. The other terminals of capacitor B-124 and diode B-126 are connected directly to ground.

The output terminals of flip-flops B-62, B-64 are connected together through a pair of series connected resistors B-128, B-130. The junction point between resistors B-128, B-130 is connected to the positive 5 volt supply source. Also connected to the output terminal of flip-flop B-62 is one terminal of a resistor B-132 having its other terminal connected to the base of an NPN transistor B-134. Similarly, the output terminal of flip-flop B-64 is also connected through a resistor B-136 to the base of an NPN transistor B-138. The emitters of transistors B-134, B-138 are respectively connected to the base of NPN transistors B-140, B-142, and the collectors of transistors B-134, B-138 are respectively connected to the collectors of transistors B-140, B-142, respectively.

The collectors of transistors B-140, B-142 are respectively connected to terminals (20), (22), and terminals (34), (36) of terminal block J-105. The emitters of transistors B-140, B-142 are connected in common to terminals (30), (32) of terminal block J-106.

The output terminals of flip-flops B-66, B-68 are connected together through a pair of series-connected resistors B-144, B-146 having their junction point connected directly to the positive 5 volt supply source. The output terminal of flip-flop B-66 is also connected through a resistor B-148 to the base of an NPN transistor B-150. Similarly, the output terminal of flip-flop B-68 is connected through a resistor B-152 to the base of an NPN transistor B-154. The output terminals of flip-flop B-168 are connected directly to terminals (40), (46), respectively, of terminal block J-106.

The collectors of transistor B-150, B-154, are respectively coupled through relays B-156, B-158 and series connected resistors B-160, B-162 to a junction point B-164. The emitters of transistors B-150, B-154 are connected in common to terminal (13) of terminal block J-106 and through a capacitor B-166 to the junction point B-164. The junction point B-164 is also connected through an inductor B-168 to terminal (5) of terminal block J-106.

Terminals (19), (21) of terminal block J-106 are respectively coupled through relay contacts B-170, B-172 to ground. The contact B-170 is actuated by relay coil B-150, and the contact B-172 is actuated by relay coil B-158.

Thus, signals applied to the input decoder circuit B-1 from the computer 24 take the form of octal numbers which are decoded by the various gates in the input decoder circuit B-1. This decoded information is stored in the RS-type flip-flops B-58 through B-68. The information signals stored in the RS-type flip-flops performs several functions. These signals control the unblanking time of the camera scope 30 and memory scope 25 through the camera scope control circuit B-4 and memory scope control circuit B-5, respectively. In addition, the camera control circuit B-6 generates a series of stepping pulses for the camera mechanism stepping motor, as well as signals to lift the shutter in the camera mechanism 22. The camera control circuit B-6 also includes circuitry for determining when a color filter disc is in the "home" position. The circuitry including transistors B-150, B-154 controls the memory scope 25 to either erase a picture that is presently being displayed on the memory scope 25 or to switch this scope from the maximum persistance value to some intermediate value.

CAMERA MOTOR CONTROL CIRCUIT

Reference is now made to FIG. 26 which illustrates the motor control circuit C-1. This circuit controls the operation of the color camera mechanism 22. More particularly, the motor control circuit C-1 includes a shutter solenoid C-2 for controlling the position of a shutter in the camera, a stepping motor C-3 for controlling the position of a multi-colored filter disc, and a sensing switch C-4 for providing an indication of the "home" position of the color filter disc.

The shutter solenoid C-2 is connected across terminals (3) and (8) of terminal block J-201. A diode C-5, polarized as shown in FIG. 26, is connected across the terminals of solenoid C-2. The stepping motor C-3 is connected across terminals (2) and (7) of terminal block J-201, and includes a diode C-6, polarized as shown in FIG. 26, connected across its terminals. Terminal (9) of terminal block J-201 is connected directly to ground and terminal (1) of that terminal block is connected through the sensing switch C-4 to ground. The sensing switch C-4 is responsive to the position of the stepping motor C-3 to provide an indication of the "home" position of stepping motor C-3.

Reference is now made to FIGS. 27 through 31 which illustrate in more detail the terminal blocks J-201 through J-106, J-115 through J-117, and J-123 through J-125. These terminal blocks interconnect the video converter circuit 38, the preprocessor circuit 40, the register circuit 42, the oscilloscope interface circuit 44, the camera control circuit C-1, the memory scope 25, the camera scope 30, and the digital computer 24. FIG. 3 illustrates the basic circuit connections between the circuits and the appropriate terminal blocks J-102 through J-106, J-115 through J-117, and J-123 through J-125. FIGS. 26 through 31 illustrate the specific circuit connections. The designations on terminal blocks J-115, J-116 and J-117 are conventional designations and are connected directly to a PDP-8/L Digital Computer manufactured by Digital Equipment Corporation.

COLOR CAMERA MECHANISM

Reference is now made to FIGS. 32 through 37 which illustrate in more detail the color camera mechanism 22 which generally comprises a clamp C-7 for attaching the camera mechanism 22 to an oscilloscope, a control mechanism C-8 positioned within a housing member C-10, and a film holder C-12 mounted on the housing member C-10.

More particularly, the camera mechanism 22 includes a generally rectangular housing C-10 having a cylindrical opening C-14 in one end and a corresponding opening C-16 in the other end thereof. A lens holder C-18 is mounted to view an image presented on the oscilloscope and performs the function of resolving this image for transmission through the cylindrical housing member C-20. A second lens holder C-22 receives the image transmitted through housing member C-20 and resolves this image for presentation on a photographic film plate (not shown) in the film holder C-12.

Figure 33:
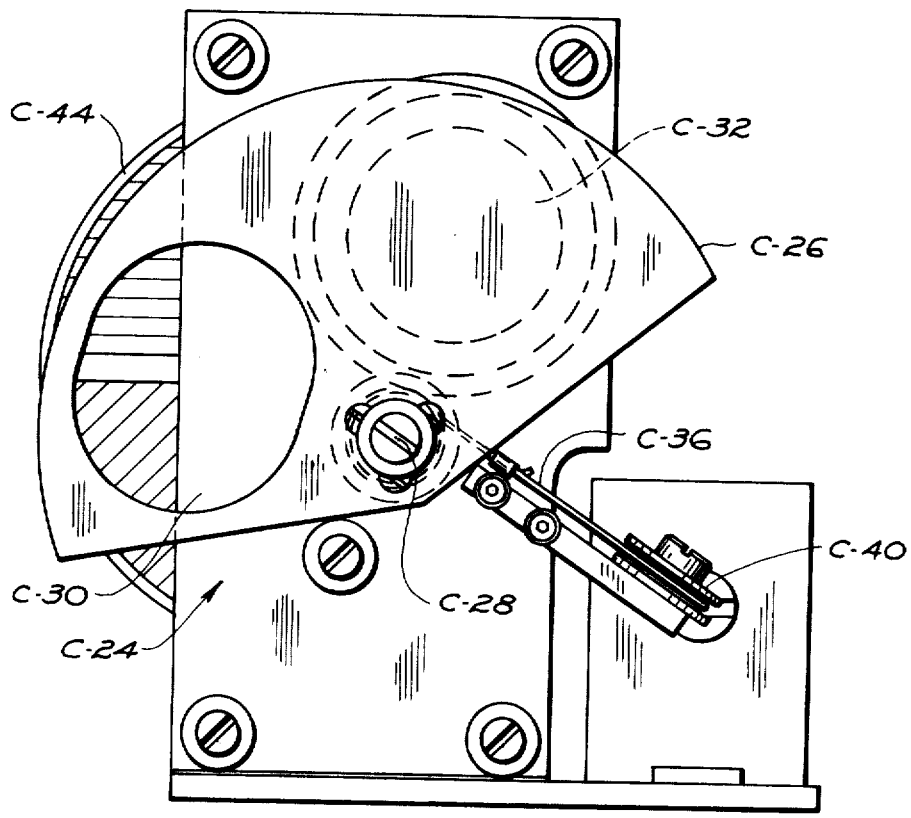
Figure 34:
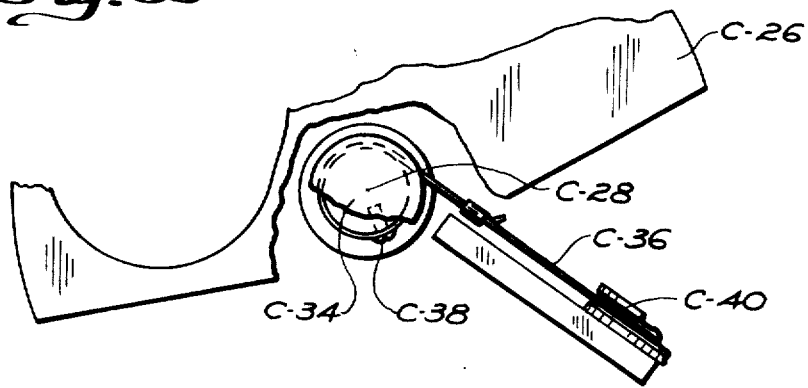
Figure 35:
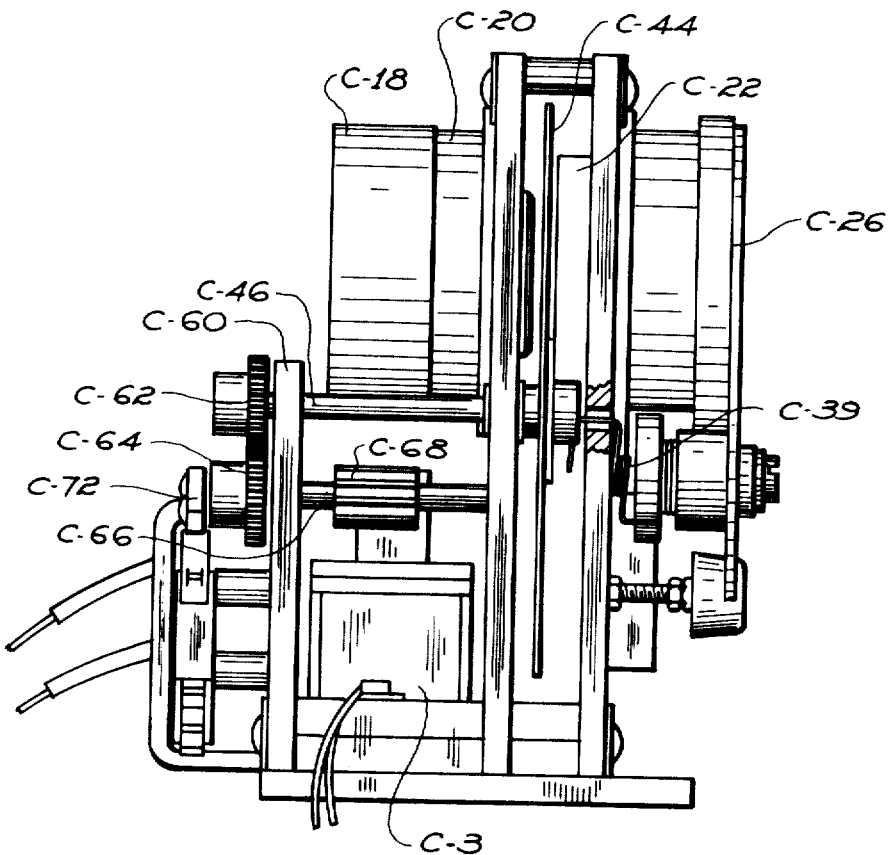
Figure 36:
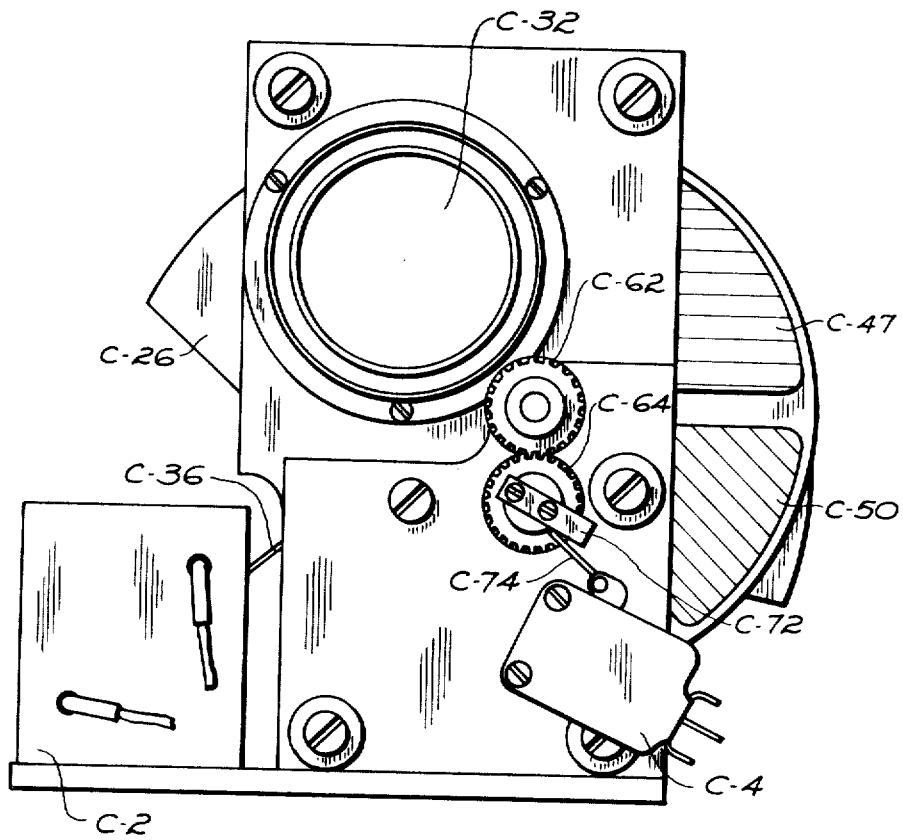
Figure 37:
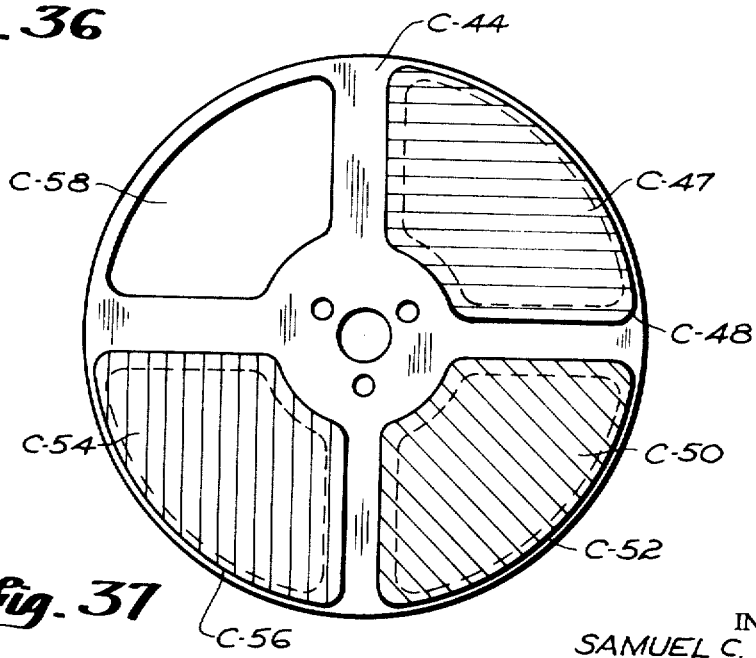

FIG. 33 illustrates the shutter mechanism C-24 of the camera mechanism 22 which generally includes a shutter plate C-26. The shutter plate C-26 is mounted to pivot about an axis C-28 from the closed position as illustrated in FIG. 33 to a position in which the opening C-30 is positioned over the image passageway C-32. The shutter plate C-26 is mounted on a shaft C-34 and a flexible cable C-36 is wrapped around shaft C-34 in a counter-clockwise direction as viewed in FIG. 3. One end of the flexible cable C-36 is attached to the shaft C-34 by a screw member C-38 as illustrated in FIG. 34, and the other end of the cable C-36 extends around a pulley C-40 and connects to the movable core C-42 of shutter solenoid C-2. Thus, upon energization of shutter solenoid C-2, the movable core C-42 is drawn into the body of the solenoid C-2 thereby causing the shutter plate C-26 to rotate in a clockwise direction in order to open the image passageway C-32. When the solenoid C-2 is de-energized, a spring member returns the shutter to the normal or closed position.

A color filter disc C-44 is mounted on a shaft C-46 for rotation. The filter disc C-44 includes four windows C-47, C-50, C-54, C-58, each of which is situated in one of the four quadrants of the disc. The first window C-47 is covered with a sheet C-48 constructed of blue-tinted transparent material. Similarly, the window C-50 is covered with a sheet C-52 of green-tinted transparent material. The window C-54 is covered with a sheet C-56 of red-tinted transparent material and the window C-58 is uncovered, or may be covered with a sheet of neutral-tinted transparent material.

The shaft C-46 is mounted in a frame member C-160 for rotation and includes a gear C-62 mounted on the end thereof. The gear C-62 engages another gear C-64, which is in turn mounted on a rotatable shaft C-66. Mounted on the shaft C-66 is still another gear C-68 which is driven by the stepping motor C-3. Thus, whenever the stepping motor C-3 is activated, the filter disc C-44 is rotated 90° in order to position the next succeeding filter in the image passage C-32.

A projection block C-72 is mounted on the gear C-64 and is positioned to strike an actuating arm C-74 of the sensing switch C-4 whenever the filter disc C-44 is in the "home" position. Whenever the actuating arm C-74 is struck by the projection block C-72, an electrical signal is developed to indicate that the filter disc C-44 is in the "home" position.

Thus, when the stepping signals are applied to terminals (2) and (7) of terminal block J-123 from the oscilloscope interface 44, the stepping motor C-3 is activated to rotate a color filter disc 90°. The sensing switch C-4 is responsive to the position of the stepping motor C-3 to provide an indication of the "home" position of the stepping motor C-3. A shutter mechanism C-24 of the camera mechanism 22 is moved to the open position upon application of signals to terminals (3) and (8) of junction block J-123 from the oscilloscope interface 44.

Thus, scintillations which are received by the imaging detector 10 are resolved into electrical signals representative of the position of each incident stimulus. These electrical signals take the form of analog signals and are converted into digital signals. These digital signals are then placed into video formated form and are then applied through the system interface 14 to the digital computer 24. The system interface 14 generates address information for each of the received signals and this address information is used to store the received signals in a channel in the computer 24 corresponding to a discrete location on the face of the detector head 13. Thus, the position of the storage channel in the digital computer 24 corresponds to a discrete location or position defined on the face of the image detector head 13. The signal stored in computer 24 is then applied through the camera interface 36 to the memory oscilloscope 25 and/or the camera oscilloscope 30.

The camera oscilloscope 30 and camera mechanism 22 are generally controlled by the teletypewriter 28, computer 24, and oscilloscope interface 44. A first color-tinted sheet is moved by the color filter disc C-44 to a position in the image passageway C-32. The shutter mechanism C-24 is then moved to the open position. Then, the stored information in the computer, is applied to the oscilloscope to present a visual image representative of scintillation intensities corresponding to the particular color-tinted sheet moved into the image passageway C-32. The face of the oscilloscope tube generally defines a plurality of channels or positions each corresponding to one of the storage channels in the core storage of the digital computer 24.

Similarly, a second color-tinted sheet is moved into the image passageway C-32 and a second image is presented on the oscilloscope representative of scintillation intensities of the second color level. Finally, the third color tinted sheet is moved into the image passageway C-32 and a third image is presented on the oscilloscope 30 representative of the third color level. In the event scintillations are of an intensity of another color level than the three primary colors, i.e., scintillations corresponding to a purple color level, these scintillations cause an image to be presented on the oscilloscope both during the time the blue-tinted sheet C-48 and the red-tinted sheet C-56 are positioned in the image passageway C-32. Accordingly, with the three primary colors, green, red, and blue, it is possible to obtain a photographic presentation comprised of numerous colors wherein each color represents a different scintillation intensity level. In addition, this multi-colored photographic presentation may be formed by only one complete revolution of the color filter disc C-44, as opposed to the continuously rotating color filter wheel of the above-referenced Jaffe et al. patent.

Although the invention has been described in connection with a preferred embodiment, it will be readily apparent to those skilled in the art that various changes in form and arrangement of parts may be made to suit requirements without departing from the spirit and scope of the appended claims.

Having thus described our invention, we claim:

1. In an imaging detection apparatus for providing a plurality of signals representative of the spatial distribution of incident stimuli from a subject under investigation, and having detection circuit means for developing electrical signals in response to the receipt of incident stimuli and circuit means coupled to said detection means for resolving a said plurality of signals into video formated signals having values representative of the positions of the incident stimuli;

an image display system adapted to be coupled to said detection circuit means for receiving said position representative signals and translating said position representative signals into an image representative of said spatial distribution of incident stimuli and comprising:

computer means including storage means having a plurality of storage channels each having an address corresponding to the location of that channel with respect to said plurality of channels;

interface means coupled to said detection circuit means and including;

video converter means adapted to be coupled to a video recorder for receiving video formated signals and including circuit means for converting the received video formated signals into a plurality of digital signals;

first circuit means for developing address information for each of said plurality of signals;

second circuit means for applying each of said plurality of signals to a channel having an address corresponding to the address information of that signal; and, output circuit means coupled to said storage means for developing signals representative of the addresses of the storage channels; and, imaging means coupled to said output circuit means for, upon receipt of said channel address representative signals, providing a said image of said incident stimuli.

2. An apparatus as defined in claim 1 wherein said video converter means includes;

separator means for separating the video formated signals into binary "1" signals, binary "0" signals and synchronizing signals;

counter means coupled to said separator means for developing a pattern of digital output signals representative of the number of received binary "1" and binary "0" signals; and, logic circuit means coupled to said separator means for actuating said counter means in response to the receipt of a synchronizing signal; and said imaging means includes;

means for producing an illuminated spot; and, means for positioning a said illuminated spot to a selected one of a plurality of points each corresponding to one of said plurality of channels, said spot positioning means being coupled to said output circuit means so that said illuminated spot is positioned at points corresponding to the addresses of said storage channels.

3. An apparatus as defined in claim 1 wherein said detection means defines a plurality of discrete positions each for receiving incident stimuli and each corresponding to one of said computer storage channels, and said first circuit means includes coding means for developing address information for each of said plurality of signals representative of the location of the discrete position having received an incident stimulus so that said second circuit means applies each of said plurality of signals into a storage channel corresponding to the discrete position having received an incident stimulus.

4. An apparatus as defined in claim 3 wherein said computer means is a digital computer including a core memory having a plurality of said storage channels.

5. In an imaging detection system having radiation detection means for developing electrical signals in response to the receipt of incident stimuli;

a color adapter system comprising:

an image display system adapted to be coupled to said detection means for receiving said electrical signals and translating said signals into an image representative of spatial distribution of said incident stimuli and comprising:

computer means including storage means having a plurality of storage channels each having an address corresponding to the location of that channel with respect to said plurality of channels;

interface means coupled to said detection circuit means and including;

first circuit means for developing address information for each of said signals;

second circuit means for applying each of said signals to a channel having an address corresponding to the address information of that signal; and, output circuit means coupled to said storage means for developing signals representative of the addresses of the storage channels; and, means for producing an illuminated spot; and, means for positioning a said illuminated spot to a selected one of a plurality of points each corresponding to one of said plurality of channels, said spot positioning means being coupled to said output circuit means so that said illuminated spot is positioned at points corresponding to the addresses of said storage channels;

a holder for a photosensitive sheet disposed to support said sheet in a position for exposure by said illuminated spot;

color means interposed between said illuminating spot producing means and said photosensitive sheet; and, means coupled to said computer storage means for changing the color characteristics of the illuminated spot in accordance with the activity of the detection means.

6. An apparatus as defined in claim 5 wherein said detection means defines a plurality of discrete positions each for receiving incident stimuli and each corresponding to one of said computer storage channels, and said first circuit means includes coding means for developing address information for each of said plurality of signals representative of the discrete position having received in incident stimulus so that said second circuit means applies each of said plurality of signals into a storage channel corresponding to the discrete position having received an incident stimulus.

7. An apparatus as defined in claim 6 wherein said computer means is a digital computer including a core memory having a plurality of said storage channels.

8. A radiation imaging device comprising detection means for developing a plurality of electrical signals which take the form of analog signals in response to the receipt of radiation; converting means coupled to said detection means for converting said analog electrical signals into electrical signals which take the form of video formated signals; digital computer means having storage means including a plurality of storage channels; interface means including video converter means for converting said video formated signals into a plurality of digital signals and circuit means for applying each of said digital signals to a preselected one of said computer storage channels; and, output circuit means coupled to said storage means for, upon actuation, developing a pattern of electrical signals representative of the signals applied to said storage means.

9. An apparatus as defined in claim 8 wherein said pattern of electrical signals take the form of digital signals and said video converter means includes;
   separator means for separating the video formated signals into binary "1" signals, binary "0" signals and synchronizing signals,
   counter means coupled to said separator means for developing a pattern of digital output signals representative of the number of received binary "1" and binary "0" signals, and,
   logic circuit means coupled to said separator means for actuating said counter means in response to the receipt of a synchronizing signal, and
   said imaging device includes output converter means for converting said pattern of electrical signals into electrical signals which take the form of analog signals.

10. An apparatus as defined in claim 9 including imaging means coupled to said output converter means for resolving said analog signals into a visual presentation representative of the values of said analog signals.

11. An apparatus as defined in claim 10 wherein said imaging means includes means for producing a spot of illumination; means for positioning said spot of illumination; and said output converter means is coupled to said spot positioning means to thereby position said illuminated spot in accordance with the values of said analog signals.

12. An apparatus as defined in claim 11 wherein said illumination spot producing and positioning means comprise a cathode ray tube.

13. An apparatus as defined in claim 11 including a holder for a photosensitive sheet disposed to support said sheet in a position for exposure by said illuminated spot; color means interposed between said illuminating spot producing means and said photosensitive sheet, and, means coupled to said computer storage means for changing the color characteristics of the illuminated spot in accordance with the activity of the detection means.

14. An apparatus as defined in claim 13 wherein said detection means defines a plurality of discrete positions each for receiving incident stimuli and each corresponding to one of said computer storage channels, and said first circuit means includes coding means for developing address information for each of said plurality of signals representative of the discrete position having received an incident stimulus so that said second circuit means applies each of said plurality of signals into a storage channel corresponding to the discrete position having received an incident stimulus.

15. An apparatus as defined in claim 14 wherein said computer means is a digital computer including a core memory having a plurality of said storage channels.

16. An imaging detection apparatus for providing a plurality of signals representative of spatial distribution and comprising:
   computer means including storage means having a plurality of storage channels each having an address corresponding to the location of that channel with respect to said plurality of channels;
   interface means coupled to said computer means and including;
   video converter means adapted to be coupled to a video recorder for receiving video formated signals and including circuit means for converting the received video formated signals into a plurality of digital signals;
   first circuit means for developing address information for each of said plurality of signals;
   second circuit means for applying each of said plurality of signals to a channel having an address corresponding to the address information of that signal; and,
   output circuit means coupled to said storage means for developing signals representative of the addresses of the storage channels; and,
   imaging means coupled to said output circuit means for, upon receipt of said channel address representative signals, providing an image of said spatial distribution.

17. An apparatus as defined in claim 16 wherein said imaging means includes;
   means for producing an illuminated spot; and,
   means for positioning a said illuminated spot to a selected one of a plurality of points each corresponding to one of said plurality of channels, said spot positioning means being coupled to said output circuit means so that said illuminated spot is positioned at points corresponding to the addresses of said storage channels.

18. A radiation imaging device comprising:
   detection means for developing a plurality of electrical signals which take the form of analog signals in response to the receipt of radiation;
   converting means coupled to said detection means for converting said plurality of analog electrical signals into electrical signals which take the form of digital signals;
   digital computer means having storage means including a plurality of storage channels;
   interface means for applying each of said digital signals to a preselected one of said computer storage channels;
   output circuit means coupled to said storage means for, upon actuation, developing output electrical signals having values representative of the signals applied to said storage means;
   imaging means for producing a spot of illumination;
   means coupled to said output circuit means for positioning said spot of illumination in accordance with the values of said output electrical signals;
   a holder for a photosensitive sheet disposed to support said sheet in a position for exposure by said illuminated spot;
   color means interposed between said illuminating spot producing means and said photosensitive sheet holder; and,
   means coupled to said output circuit means for changing the color characteristics of the illuminated spot in accordance with the activity of the detection means.

19. An apparatus as defined in claim 18 wherein said color means includes color filter means interposed between said illumination spot producing means and said holder for a photosensitive sheet, said filter means including at least two means defining spectral bands; and means coupled to said circuit means for rotating said color filter means to position a selected one of the spectral defining means between said spot producing means and said holder in accordance with the value of a corresponding one of said signals.

20. An apparatus as defined in claim 19 wherein said color filter means includes a color wheel having a plurality of filters spaced around an axis of rotation for changing the color characteristics of said spot of illumination; and said rotating means includes a stepping motor, for upon being actuated, rotating said color filter means until a selected one of said plurality of filter means is interposed between said spot producing means and said photosensitive sheet holder.

21. An apparatus as defined in claim 20 including shutter means interposed between said spot producing means and said photosensitive sheet holder; and actuating means coupled to said shutter means for, upon energization, opening said shutter means to allow light energy from said illuminating spot to strike said holder.

22. In a radiation imaging device having circuit means for producing a train of signals having values representative of radiation activity of discrete positions, means for producing a spot of illumination, means for positioning said spot of illumination at coordinate positions corresponding to said discrete positions, a holder for a photosensitive sheet, a color adapter comprising:
   color filter means interposed between said illumination spot producing means and said holder for a photosensitive sheet, said filter means including at least two means defining spectral bands; and,
   means coupled to said circuit means for rotating said color filter means to position a selected one of the spectral defining means between said spot producing means and said holder in accordance with the value of a corresponding one of said signals.

23. An apparatus as defined in claim 22 wherein said color filter means includes a color wheel having a plurality of filters spaced around an axis of rotation for changing the color characteristics of said spot of illumination; and said rotating means includes a stepping motor, for upon being actuated, rotating said color filter means until a selected one of said plurality of filter means is interposed between said spot producing means and said photosensitive sheet holder.

24. An apparatus as defined in claim 23 including shutter means interposed between said spot producing means and said photosensitive sheet holder; and actuating means coupled to said shutter means for, upon energization, opening said shutter means to allow light energy from said illuminating spot to strike said holder.

25. In an imaging detection apparatus for providing a plurality of signals representative of the spatial distribution of incident stimuli from a subject under investigation, and having detection circuit means for developing electrical signals in response to the receipt of incident stimuli and circuit means coupled to said detection means for resolving a said plurality of signals into video formated signals having values representative of the positions of the incident stimuli;
   an image display system adapted to be coupled to said detection circuit means for receiving said position representative signals and translating said position representative signals into an image representative of said spatial distribution of incident stimuli and comprising:
   computer means including storage means having a plurality of storage channels each having an address corresponding to the location of that channel with respect to said plurality of channels;
   interface means coupled to said detection circuit means and including;
   video converter means adapted to be coupled to a video recorder for receiving video formated signals and including circuit means for converting the received video formated signals into a plurality of digital signals;
   first circuit means for developing address information for each of said plurality of signals;
   second circuit means for applying each of said plurality of signals to a channel having an address corresponding to the address information of that signal; and,
   output circuit means coupled to said storage means for developing signals representative of the addresses of the storage channels; and,
   imaging means coupled to said output circuit means for, upon receipt of said channel address representative signals, providing a said image of said incident stimuli;
   a holder for a photosensitive sheet disposed to support said sheet in a position for exposure by said illuminated spot;
   color means interposed between said illuminating spot producing means and said photosensitive sheet holder; and,
   means coupled to said output circuit means for changing the color characteristics of the illuminated spot in accordance with the activity of the detection means.

26. An apparatus as defined in claim 25 wherein said color means includes color filter means interposed between said illumination spot producing means and said holder for a photosensitive sheet, said filter means including at least two means defining spectral bands; and means coupled to said circuit means for rotating said color filter means to position a selected one of the spectral defining means between said spot producing means and said holder in accordance with the value of a corresponding one of said signals.

27. An apparatus as defined in claim 26 wherein said color filter means includes a color wheel having a plurality of filters spaced around an axis of rotation for changing the color characteristics of said spot of illumination; and said rotating means includes a stepping motor, for upon being actuated, rotating said color filter means until a selected one of said plurality of filter means is interposed between said spot producing means and said photosensitive sheet holder.

28. An apparatus as defined in claim 27 including shutter means interposed between said spot producing means and said photosensitive sheet holder; and actuating means coupled to said shutter means for, upon energization, opening said shutter means to allow light energy from said illuminating spot to strike said holder.

29. A method of operating a radiation imaging device having means for producing a spot of illumination, a holder for a photosensitive sheet positioned to receive light energy from the spot of illumination, means for moving the spot of illumination to a plurality of predetermined coordinate positions, color means having at least two filter positions each of which defines a spectral band, comprising the steps of:
   positioning said color means so that one of said color filter portions is interposed between the illumination spot and the photosensitive sheet holder;

moving said illumination spot to a plurality of predetermined positions;

positioning said color means so that another one of said color filter portions is interposed between the illumination spot and the photosensitive sheet holder; and, moving said illumination spot to a plurality of predetermined positions.

30. A method of operating a radiation imaging device having means for producing a spot of illumination, a holder for a photosensitive sheet positioned to receive light energy from the spot of illumination, means for moving the spot of illumination to a plurality of predetermined coordinate positions, color means having at least two filter positions each of which defines a spectral band, comprising the steps of:

positioning said color means so that one of said color filter portions is interposed between the illumination spot and the photosensitive sheet holder;

moving said illumination spot to a first plurality of predetermined positions;

positioning said color means so that another one of said color filter portions is interposed between the illumination spot and the photosensitive sheet holder; and, moving said illumination spot to a second plurality of predetermined positions at least some of which are coincident with positions of said first plurality of predetermined positions.

31. A method of operating a radiation imaging device having means for producing a spot of illumination, a holder for a photosensitive sheet positioned to receive light energy from the spot of illumination, means for moving the spot of illumination to a plurality of predetermined coordinate positions, color means having at least three filter positions each of which defines a spectral band, comprising the steps of:

positioning said color means so that one of said color filter portions is interposed between the illumination spot and the photosensitive sheet holder;

moving said illumination spot to a first plurality of predetermined positions;

positioning said color means so that the second one of said color filter portions is interposed between the illumination spot and the photosensitive sheet holder;

moving said illumination spot to a second plurality of predetermined positions at least some of which are coincident with positions of said first plurality of predetermined positions;

positioning said color means so that a third one of said color filter portions is interposed between the illumination spot and the photosensitive sheet holder; and, moving said illumination spot to a third plurality of predetermined positions at least some of which are coincident with positions of said first and second plurality of predetermined positions.

* * * * *